United States Patent
McFarlane

(10) Patent No.: US 11,407,469 B2
(45) Date of Patent: Aug. 9, 2022

(54) COLLAPSIBLE BICYCLE FRAME

(71) Applicant: brechin design inc., Toronto (CA)

(72) Inventor: Alan Brechin McFarlane, Toronto (CA)

(73) Assignee: brechin design inc., Toronto (CA)

( * ) Notice: Subject to any disclaimer, the term of this patent is extended or adjusted under 35 U.S.C. 154(b) by 123 days.

(21) Appl. No.: 16/970,787

(22) PCT Filed: Feb. 22, 2019

(86) PCT No.: PCT/CA2019/000026
§ 371 (c)(1),
(2) Date: Aug. 18, 2020

(87) PCT Pub. No.: WO2019/161482
PCT Pub. Date: Aug. 29, 2019

(65) Prior Publication Data
US 2021/0122438 A1   Apr. 29, 2021

Related U.S. Application Data

(60) Provisional application No. 62/633,879, filed on Feb. 22, 2018.

(51) Int. Cl.
*B62K 15/00* (2006.01)
*B62J 1/08* (2006.01)

(52) U.S. Cl.
CPC .............. *B62K 15/008* (2013.01); *B62J 1/08* (2013.01)

(58) Field of Classification Search
CPC .... B62K 15/008; B62K 15/006; B62K 15/00; B62K 2015/003; B62K 2015/001; B62J 1/08
See application file for complete search history.

(56) References Cited

U.S. PATENT DOCUMENTS 2,777,711 A * 1/1957 Yokomaki ............ B62K 15/006
280/287
3,374,009 A * 3/1968 Jeunet .................. B62K 15/006
280/287
(Continued)

FOREIGN PATENT DOCUMENTS

DE    4311998 A1   10/1994
EP    1801004 A1    6/2007
(Continued)

OTHER PUBLICATIONS

Booij, Nico, European Patent Office, Extended European Search Report, in connection with related European Patent Application No. 19757405.6, dated Oct. 28, 2021, 11 pages.
(Continued)

*Primary Examiner* — Jacob D Knutson
*Assistant Examiner* — Abigail R Hymel

(57) ABSTRACT

A bicycle and frame are disclosed, including a unitary front frame and a rear frame. The front frame includes a down tube rigidly connected to a head tube, a steerable front wheel assembly, and a crossbar rigidly fixed to one or both of the head tube and the down tube. The down tube is connected to the rear frame at a pivot proximate the bottom bracket shell. The rear frame includes a seat tube, a bottom bracket shell and a chainstay, all rigidly connected at the bottom bracket shell. A frame lock is disposed at the rearward end of the crossbar, for locking to the rear frame to substantially immobilize the pivot, placing the frame in a riding condition. The frame lock, when disengaged, facilitates relative movement of the front frame and the rear frame towards each other about the pivot, in a common vertical plane, to place the frame in a collapsed position, such that the down tube lies alongside the seat tube and the front frame and the rear frame are nested.

21 Claims, 18 Drawing Sheets

(56) References Cited

U.S. PATENT DOCUMENTS

| | | | |
|---|---|---|---|
| 3,814,462 A | 6/1974 | Kelly | |
| 4,111,447 A | 9/1978 | Ishida | |
| 4,441,729 A * | 4/1984 | Underwood | B62K 15/00 |
| | | | 280/278 |
| 4,824,131 A | 4/1989 | Thay | |
| 5,149,119 A | 9/1992 | Hwang | |
| 6,267,401 B1 | 7/2001 | De Jong | |
| 6,336,649 B1 * | 1/2002 | Lin | B62H 1/02 |
| | | | 224/418 |
| 6,702,312 B1 | 3/2004 | Miksik | |
| 6,979,013 B2 | 12/2005 | Chen | |
| 7,490,842 B1 | 2/2009 | Ulrich et al. | |
| 8,123,243 B2 | 2/2012 | Ho | |
| 8,308,178 B2 | 11/2012 | Hoerdum et al. | |
| 8,794,652 B2 | 8/2014 | Ritchey | |
| 8,925,950 B2 | 1/2015 | Falzari | |
| 9,475,538 B2 | 10/2016 | Wang et al. | |
| 2002/0167151 A1 * | 11/2002 | Tseng | B62K 25/005 |
| | | | 280/286 |
| 2007/0018421 A1 | 1/2007 | Chen | |
| 2007/0210556 A1 * | 9/2007 | Hon | B62K 15/008 |
| | | | 280/287 |
| 2016/0214676 A1 * | 7/2016 | Lutz | B62K 15/008 |
| 2016/0288857 A1 * | 10/2016 | Boutakis | B62K 3/10 |
| 2017/0210439 A1 | 7/2017 | Schwaiger | |
| 2017/0247076 A1 | 8/2017 | Uimonen | |
| 2018/0346053 A1 * | 12/2018 | Ahrens | B62K 5/06 |

FOREIGN PATENT DOCUMENTS

| | | |
|---|---|---|
| EP | 3284664 A1 | 2/2018 |
| FR | 3007381 B1 | 6/2017 |
| GB | 415843 A | 9/1934 |
| GB | 1250876 A | 10/1971 |
| GB | 2296224 A | 6/1996 |
| NL | 1034541 C2 | 4/2009 |

OTHER PUBLICATIONS

International Search Report and Written Opinion of the International Searching Authority issued by the Canadian Intellectual Property Office in connection with International Patent Application No. PCT/CA2019/000026, dated May 1, 2019, 9 pages.

* cited by examiner

COLLAPSIBLE BICYCLE FRAME

RELATED APPLICATIONS

This application claims the benefit of provisional patent application 62/633,879 entitled "COLLAPSIBLE BICYCLE AND FRAME", filed on Feb. 22, 2018 and incorporated herein by reference in its entirety.

BACKGROUND

1. Field

This disclosure relates generally to bicycles and more particularly to a bicycle having a collapsible frame.

2. Description of Related Art

Conventional bicycles provide an efficient means of transport in both urban and rural areas. Folding bicycles have application where there is limited space, or there are restrictive rules for transporting a bicycle, such as on public transport, car, airplane, ferry, or train, in urban condominiums or workplaces. Folding bicycles also have application where there is limited access to secure storage for the bicycle, such as in urban condominiums, workplaces, small dwellings, and places with difficult or tight access.

The predominant frame geometry for conventional bicycles is commonly referred to as a "diamond frame", which has fixed front and rear triangles, or a front diamond and rear triangle and is generally accepted to provide superior riding characteristics and have good rigidity to weight ratio. Many examples of folding bicycles have non-conventional frame geometry, often have smaller wheels, and offer less than satisfactory riding performance and comfort. Existing folding or collapsible bicycles often deviate significantly from the "diamond frame" form and may also incorporate joints such as laterally pivoting hinges that add to the weight of the bicycle while reducing the rigidity of the frame. Some examples of folding bicycles are designed to locate the rear wheel under the down tube when folded, which necessitates significant departure from the "diamond frame" configuration.

Bicycles having a conventional frame geometry and sizing are generally more comfortable to ride, have improved handling, and improved road performance.

SUMMARY

In accordance with one disclosed aspect there is provided a bicycle frame. The bicycle frame includes a rear frame structure including a seat tube having a lower end and an upper end, the upper end being operably configured to receive a seat post for mounting a seat. The rear frame structure also includes a bottom bracket shell for receiving a bottom bracket operably configured to rotatably mount a crankset, and at least one chainstay extending rearwardly and terminating in a rear wheel mount for receiving a rear wheel. A forward end of the chainstay, the lower end of the seat tube, and the bottom bracket shell are rigidly connected proximate the bottom bracket shell. The bicycle frame also includes a front frame structure including a down tube rigidly connected to a forwardly disposed head tube, the head tube configured to receive a steerable front wheel mount for receiving a front wheel. The down tube is connected to the rear frame structure at a pivot proximate the bottom bracket shell, the pivot facilitating pivoting of the front frame structure with respect to the rear frame structure in a common vertical plane, about the pivot. The bicycle frame also includes a frame lock, which when engaged substantially immobilizes the pivot to place the frame in a riding condition, the frame lock, when disengaged, facilitating relative movement of the down tube and the seat tube towards each other about the pivot in the common vertical plane, to place the frame in a collapsed condition wherein the down tube lies alongside the seat tube.

The rear frame structure may further include at least one seat stay extending between the seat tube and the at least one chainstay.

The frame lock may include a crossbar spanning between the front frame structure and the rear frame structure and having an end operably configured to disconnect from one of the front frame structure and the rear frame structure to permit the front frame structure to move in the common vertical plane about the pivot.

The crossbar may have a forward end rigidly fixed to one of the down tube and the head tube and the rearward end may be operably configured to disconnect from the rear frame structure.

At least a portion of the rearward end of the crossbar may include at least one arm laterally displaced with respect to the common vertical plane to provide clearance between the crossbar and the seat tube when the frame lock is disengaged and the front frame structure is pivoted toward the rear frame structure when placing the frame in the collapsed condition.

The at least one arm may include a pair of arms laterally displaced toward either side of the common vertical plane.

The at least one arm may be operably configured to permit the rear wheel to remain mounted in the rear wheel mount when placing the frame in the collapsed condition.

The at least one arm may be operably configured to provide clearance between the at least one arm and drivetrain components of the bicycle to permit the drivetrain to remain configured for the riding condition and to further facilitate rotation of the rear wheel when the frame is in the collapsed condition.

The at least one arm may be configured to provide clearance between the crossbar and at least one of the upper end of the seat tube and the seat post when placing the frame in the collapsed condition.

The frame lock may include a fastener for connecting corresponding features on the crossbar and the front frame structure or rear frame structure to lock the frame in the riding condition.

The rearward end of the crossbar may terminate at a location partway between the bottom bracket shell and the upper end of the seat tube to provide a step through frame geometry.

The bicycle frame may include a frame retainer operably configured to releasably secure the front frame structure to the rear frame structure when the frame is in the collapsed condition.

The frame lock may be disposed proximate the upper end of the seat tube.

The frame lock may include a length of tube disposed at the rearward end of the crossbar and oriented to align with the upper end of the seat tube when the frame is in the riding condition, the length of tube being operable to act as the frame lock by receiving a seat post inserted through the length of tube and secured within the upper end of the seat tube.

The frame lock may include a brace releasably secured between a location proximate the lower end of the down tube and a location proximate the lower end of the seat tube, the brace being operable to immobilize the pivot when the frame is in the riding condition.

The brace may be disposed laterally with respect to the common vertical plane and above a chainring of the crankset and may have an arcuate shape for providing clearance for rotation of the chainring.

The pivot may be disposed adjacent to and forward of the bottom bracket such that when the frame is in the collapsed condition the down tube is generally disposed alongside the seat tube.

The pivot may be sized and configured to prevent lateral flexing of the frame about the pivot.

The pivot may be concentric with the bottom bracket shell.

The bottom bracket shell may include a pair of cylindrical bores that are laterally spaced apart, a central cylindrical bore disposed between and aligned with the pair cylindrical bores, and either the pair of cylindrical bores or the central cylindrical bore may be connected to the down tube, and a cylindrical sleeve having an outer surface sized to fit through the pair of cylindrical bores and the central cylindrical bore for forming the pivot, the sleeve having an inner bore sized to receive a bottom bracket for mounting the crankset.

The cylindrical sleeve may be fixed to at least one of the pair of cylindrical bores or the central cylindrical bore by any of a press fit, a bonding process, a threaded connection, and a welded or braised connection.

The frame lock, when engaged, may be operably configured to inhibit operation of the pivot between the pair of cylindrical bores and the central cylindrical bore when the frame is in the riding condition.

The bicycle frame may include at least one of a wheel retainer disposed on the frame for attaching the front wheel to the collapsed frame such that the front wheel lies alongside the collapsed frame, and a wheel retainer disposed on the frame for attaching the rear wheel to the collapsed frame such that the rear wheel lies alongside the collapsed frame.

The bicycle frame, when in the collapsed condition and having the front wheel and the rear wheel attached to the respective wheel retainers may have an extent that falls within commonly applicable airline travel restrictions associated with checked baggage.

The frame may be configured to generally correspond to a frame geometry and a wheel size associated with one of a conventional bicycle, an electric bicycle having an integrated electric motor for propulsion, a road bicycle, an urban commuter bicycle, a touring bicycle, a hybrid bicycle, a cyclocross bicycle, a single speed cross country mountain bicycle with rear suspension, an internally geared rear hub cross country mountain bicycle with rear suspension, and a fat bicycle.

The wheel size may include a full size wheel conventionally associated with the frame configuration.

A bicycle in accordance with another disclosed aspect may include the bicycle frame as defined above and further including a rear wheel mounted in the rear wheel mount, a steerable front wheel mount mounted in the head tube, a front wheel mounted in the front wheel mount, and a saddle mounted via a seat post in the upper end of the seat tube.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Road Bicycle Frame

Figure 1A:
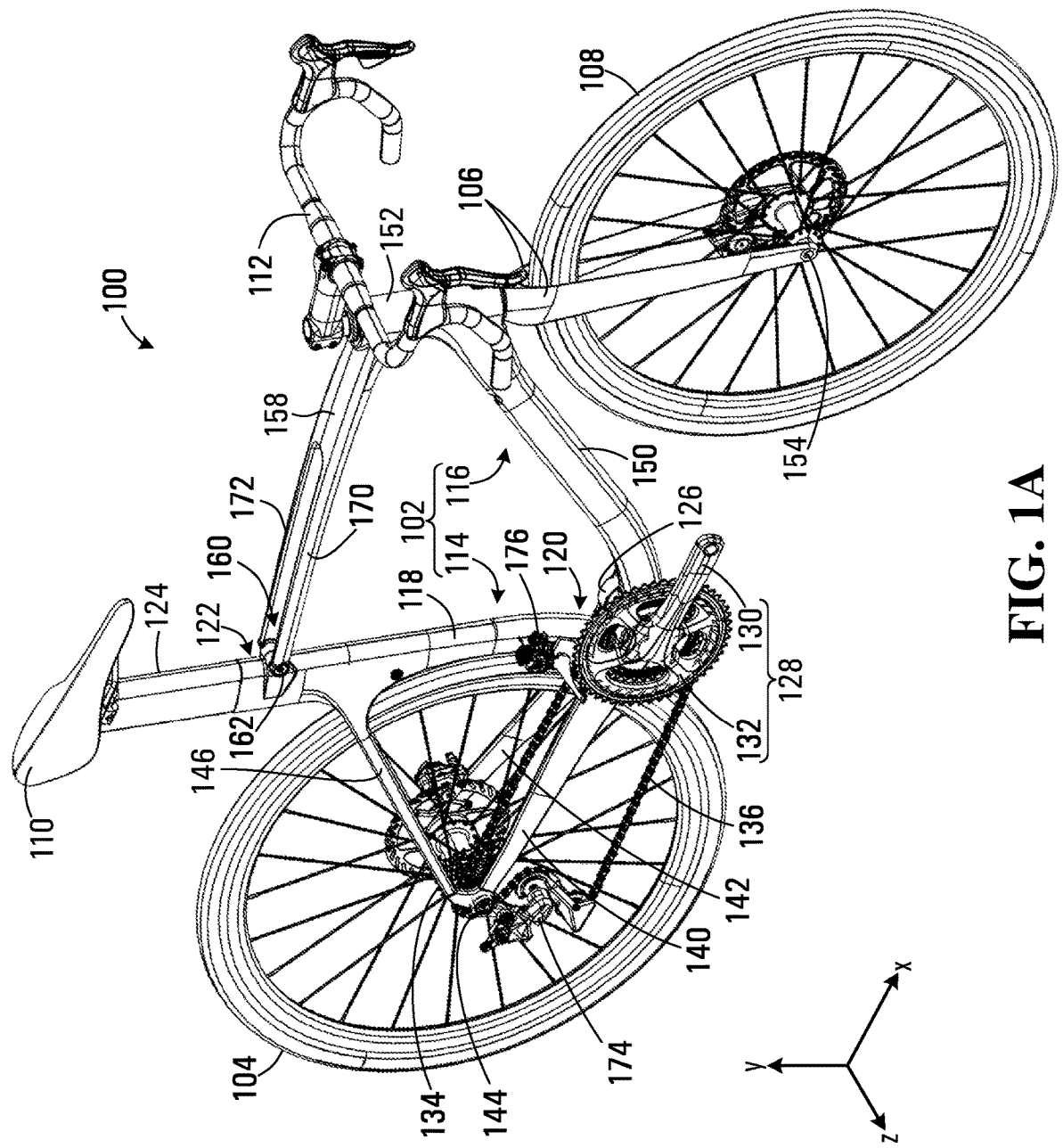
FIG. 1A is a right side perspective view of a bicycle in a riding condition in accordance with a first disclosed embodiment.
Figure 1B:
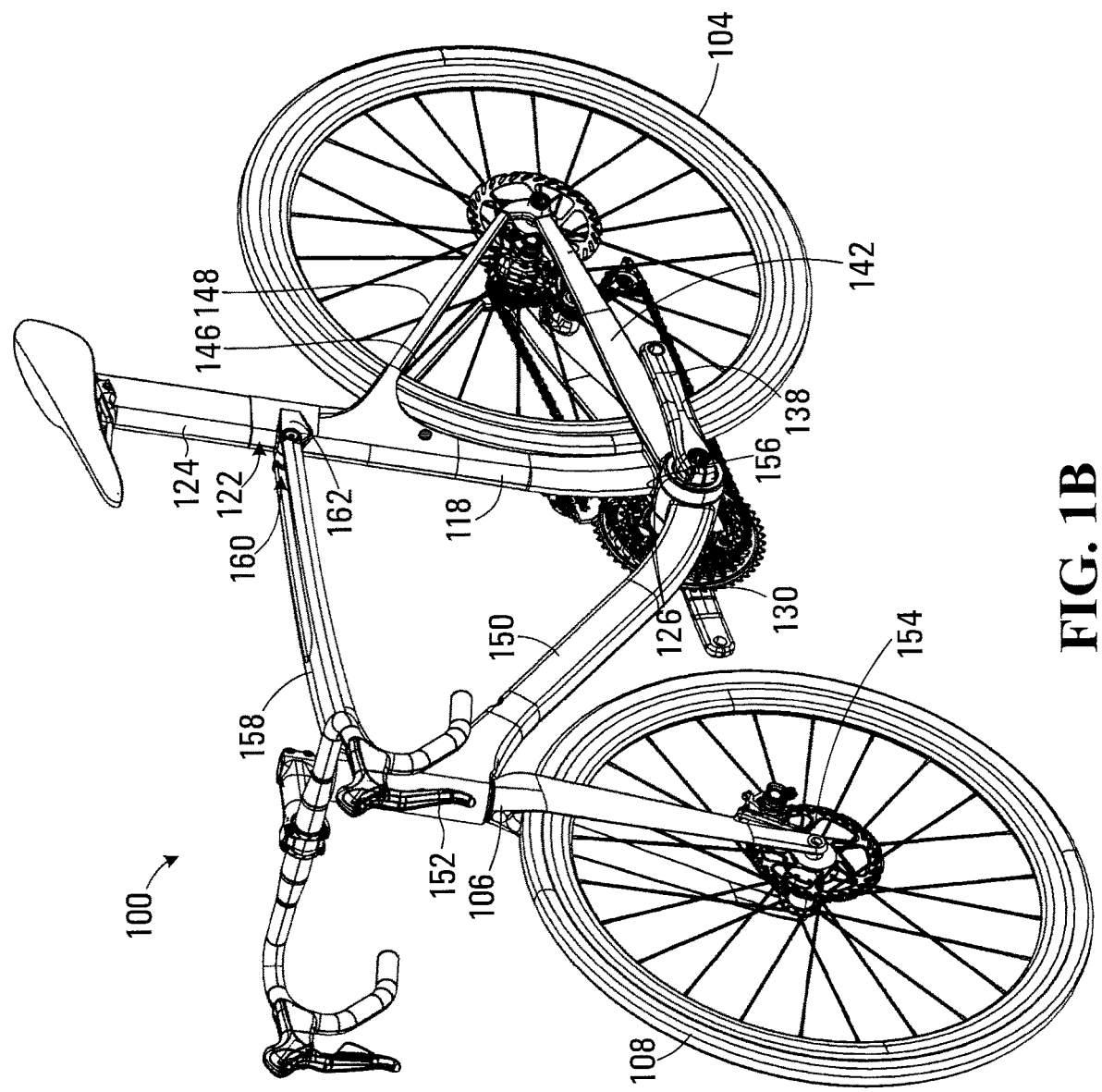
FIG. 1B is a left side perspective view of the bicycle in the riding condition shown in FIG. 1A.

Referring to FIGS. 1A and 1B, a bicycle in accordance with a first disclosed embodiment is shown generally at 100 and includes a frame 102, a rear wheel 104, a steerable front wheel mount 106, a front wheel 108, and a seat 110. A handlebar 112 is coupled to the steerable front wheel mount 106 for turning the front wheel 108. The bicycle frame 102 includes a rear frame structure 114 and a front frame structure 116. The bicycle 100 is shown in FIG. 1A and FIG. 1B from different sides with the frame 102 in a riding condition.

The bicycle 100 and frame 102 is configured to generally correspond to a frame geometry and a wheel size associated with a conventional road or racing bicycle. In this embodiment the frame 102 is shown as a carbon fiber reinforced polymer structure. Elements of the bicycle frame 102 may be formed as unitary structures during the fabrication process. In other embodiments the frame 102 may be fabricated using steel, aluminum, or titanium tubing welded at connections to form the frame structures.

The rear frame structure 114 includes a seat tube 118 having a lower end 120 and an upper end 122. The upper end 122 is configured to receive a seat post 124 for mounting the seat 110. The rear frame structure 114 also includes a bottom bracket shell 126. The bicycle 100 also includes a crankset 128 that is mounted via a bottom bracket within the bottom bracket shell 126. The bottom bracket is a common term used to refer to components associated with rotatably mounting a crankset on a bicycle and typically includes bearings and bearing housings that receive a spindle on which the crankset is mounted. The spindle may be integral with the crankset or part of the bottom bracket itself, depending on the type of bottom bracket that is being implemented.

In the embodiment shown, the crankset 128 includes a right side crank 130 connected to a chainring set 132 that drives a rear sprocket set 134 via a chain 136. A left hand crank 138 (shown in FIG. 1B) is also connected to the spindle within the bottom bracket. The crankset 128, left crank 138, rear sprocket 134, and chain 136 together form a drivetrain of the bicycle 100. In other embodiments the drivetrain may be implemented using a drive belt in place of the chain 136 or by implementing a shaft-based drivetrain. Pedals, which are generally selected in accordance with the rider's preference, are not shown mounted on the cranks 130 in FIG. 1A or FIG. 1B. The rear sprocket set 134 in this embodiment includes a plurality of adjacent sprockets of differing size and the bicycle 100 includes a rear derailleur 174 for moving the chain 136 between sprockets to change a gear ratio associated with the drivetrain. Similarly the chainring set 132 includes two adjacent chainrings of differing size and a front derailleur 176 is included to change the gear ratio of the drivetrain.

The rear frame structure 114 also includes a pair of spaced apart chainstays 140 and 142 extending rearwardly and terminating in a rear wheel mount 144 for receiving the rear wheel 104. The term "chainstay" as used herein is not intended to exclude other non-chain based drivetrains as described above. For the bicycle 100 with a chain-based drivetrain the chainstays 140 and 142 are commonly referred to as chainstays. The rear wheel mount 144 may include a pair of dropouts that receive and retain a hub of the rear wheel 104. In the embodiment shown the rear wheel mount 144 is implemented as a through axle that is inserted laterally through a cylindrical dropout opening and through a lateral bore in the hub of the rear wheel 104. In other embodiments the wheel may be secured within c-shaped dropouts via wheel nuts or via a quick release lever and skewer that pass through a lateral bore in the hub of the wheel.

A forward end of each of the chainstays 140 and 142, the lower end 120 of the seat tube 118, and the bottom bracket shell 126 are rigidly connected proximate the bottom bracket shell to form the rear frame structure 114. In the embodiment shown the rear frame structure 114 also includes a pair of spaced apart seat stays 146 and 148 (the seat stay 148 is shown in FIG. 1B) that each extend generally between the upper end 122 of the seat tube 118 and connect to respective chainstays 140 and 142. The seat stays 146 and 148, the chainstays 140 and 142, and the seat tube 118 together form a substantially rigid triangular structure that provides sufficient stiffness for the rear frame structure 114 for transferring power from the crankset 128 to the rear wheel via the chain 136. In some embodiments the seat stays 146 and 148 may be omitted and the chainstays 140 and 142 appropriately sized and configured to provide sufficient stiffness for supporting the rear wheel 104. In some embodiments a single oversized chainstay may be used to support the rear wheel in a single sided rear wheel mount.

The front frame structure 116 includes a down tube 150 supporting a forwardly disposed head tube 152. The head tube 152 is configured to receive the steerable front wheel mount 106, which terminates in a front wheel mount 154 for mounting the front wheel. The front wheel 108 may be mounted in a conventional forked dropout or via a through axle and may be secured by a quick release mechanism that permits the wheel 108 to be removed without tools.

The down tube 150 is connected to the rear frame structure 114 at a pivot 156, which in this embodiment is concentric with the bottom bracket shell 126. In other embodiments described later herein the pivot 156 may be proximate but not concentric with the bottom bracket shell 126. The pivot 156 facilitates pivoting of the front frame structure 116 with respect to the rear frame structure in the common vertical plane about the pivot. The rear wheel 104, the rear frame structure 114, and the front frame structure 116 all lie within the common vertical plane (i.e. the x-y plane or the plane of the rear wheel in FIG. 1A).

The frame 102 also includes a frame lock 162, which when engaged substantially immobilizes the pivot 156 to place the frame in the riding condition shown in FIG. 1A and FIG. 1B. The front frame structure 116 includes a crossbar 158 spanning between the front frame structure and the rear frame structure 114 and the frame lock 162 is disposed at a rearward end 160 of the crossbar. The frame lock 162 is configured to permit the front frame structure 116 to disconnect from the rear frame structure 114 for movement in the common vertical plane about the pivot 156. In the embodiment shown, the rearward end 160 of the crossbar 158 includes pair of arms 170 and 172 that are laterally displaced toward either side of the common vertical plane (i.e. the x-y plane). The pair of arms 170 and 172 are connected to the seat tube 118 at the frame lock 162, which in this embodiment is disposed proximate the upper end 122 of the seat tube 118. In other embodiments the frame lock 162 may be disposed elsewhere on the seat tube 118 or elsewhere on the rear frame structure 114.

The pivot 156 and frame lock 162 are configured to reduce lateral flexing with respect to the vertical plane as well as flexing within the common vertical plane such that the frame 102 behaves as a substantially unitary frame. Examples of such pivoting connections may be found on existing mountain bicycle designs, where the intention of the pivot is to permit relative movement between frame structures while riding. The pivot 156 differs from a conventional mountain bicycle pivoting connection in that the frame lock 162 causes the pivot 156 to be substantially immobilized while riding the bicycle 100. Under these conditions, there should be minimal discernible difference between the riding performance of the bicycle 100 and similar conventional road or racing bicycles.

Figure 2A:
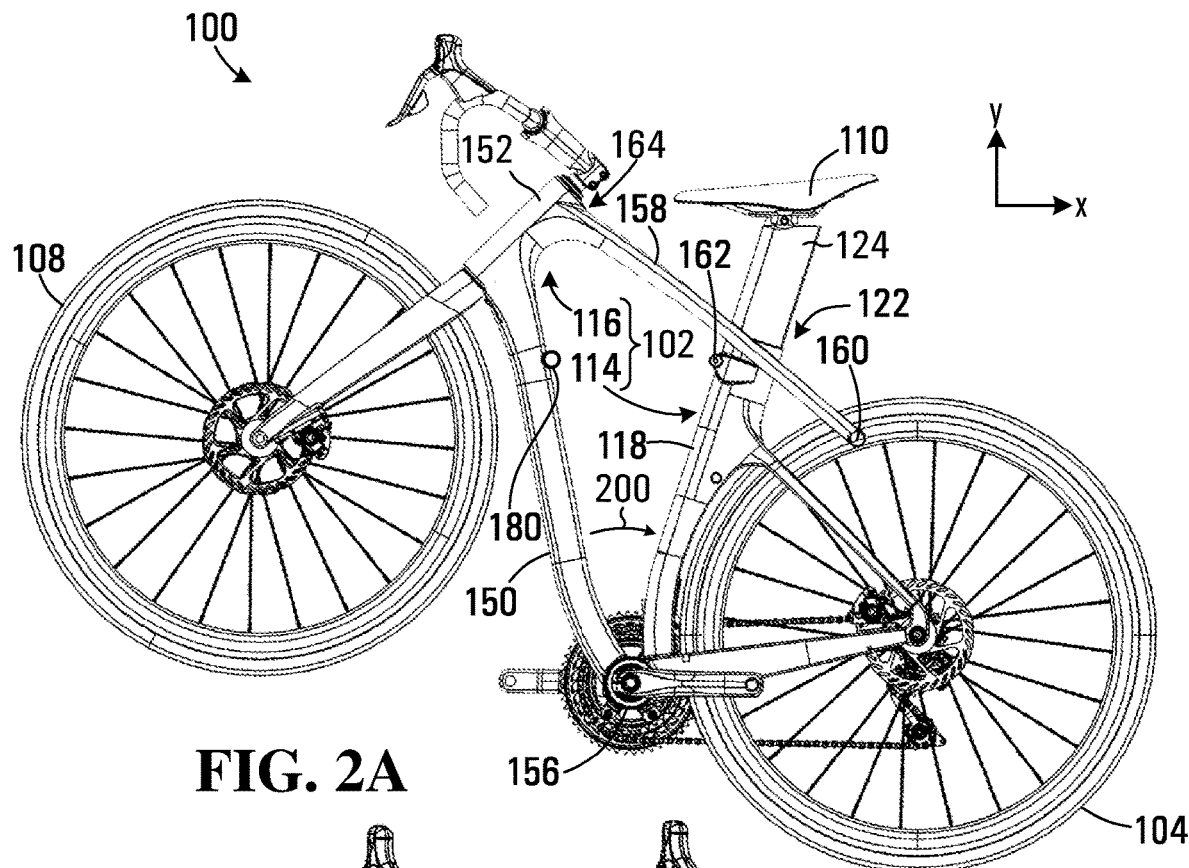
FIG. 2A is an elevational view of the bicycle shown in FIGS. 1A and 1B in a partially collapsed condition.

The bicycle 100 is shown in successive FIGS. 2A-2D while being collapsed to place the bicycle frame 102 in a fully collapsed condition. Referring to FIG. 2A, the frame lock 162 is disengaged, facilitating relative movement of the down tube 150 and the seat tube 118 towards each other about the pivot 156 in the common vertical plane, as indicated by the arrow 200 in FIG. 2A. The frame 102 is placed in a collapsed condition when the down tube 150 lies alongside the seat tube 118. In this embodiment the crossbar 158 has a forward end 164 fixed to the head tube 152 and the crossbar, head tube 152, and down tube 150 move together as a unitary front frame structure 116. The front frame structure 116 may be formed as a unitary element during the carbon fiber composite layup process.

Figure 2B:
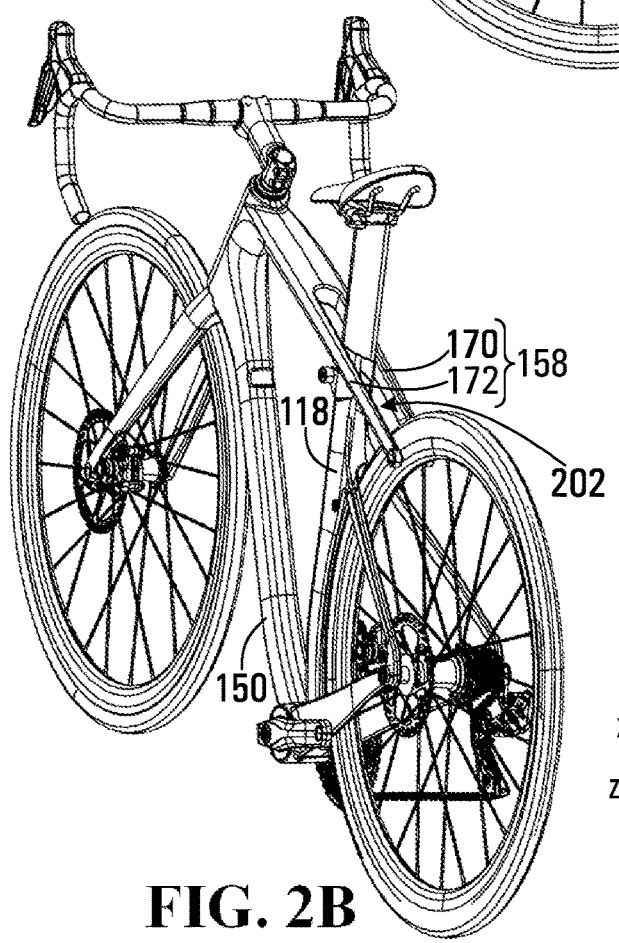
FIG. 2B is a rear perspective view of the partially collapsed bicycle shown in FIG. 2A.

In FIG. 2A the frame 102 is shown in a partially collapsed condition where the down tube 150 has moved toward the seat tube 118 and the rearward end 160 of the crossbar 158 has moved past the upper end 122 of the seat tube 118. Referring to FIG. 2B, the bicycle 100 is shown from a rear perspective in the same partially collapsed condition as shown in FIG. 2A. In this embodiment, an opening 202 between the pair of spaced apart arms 170 and 172 of the crossbar 158 provides clearance between the crossbar and the seat tube 118 while the down tube 150 is being pivoted toward the seat tube 118. In this embodiment the arms 170 and 172 also provide clearance between the crossbar 158 and the rear wheel 104, such that the rear wheel is able to remain mounted in the rear wheel mount 144 while collapsing the bicycle frame 102.

Figure 2C:
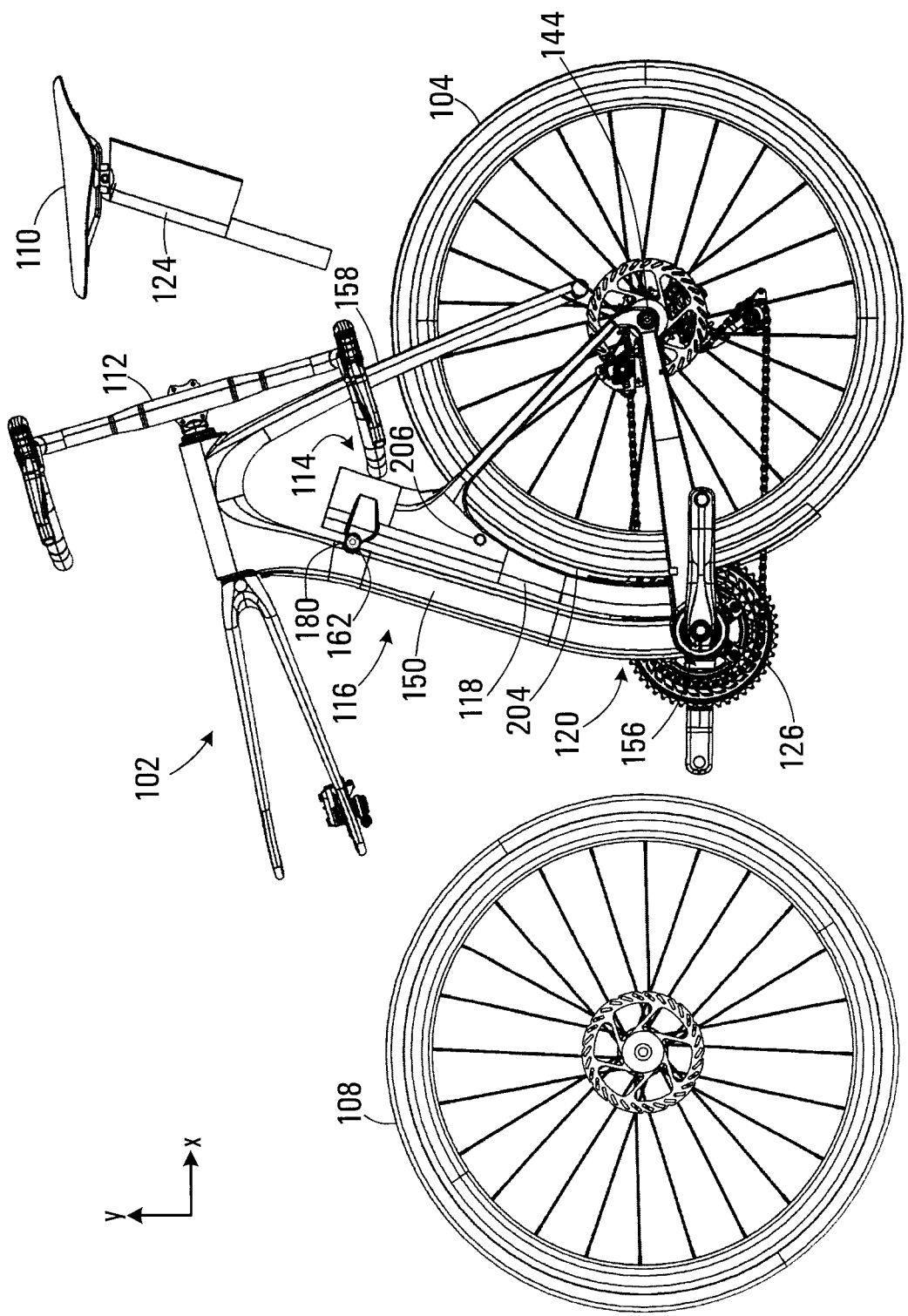
FIG. 2C is a perspective view of the bicycle shown in FIGS. 1A and 1B with the frame in a collapsed condition.

Referring to FIG. 2C, the bicycle frame 102 is shown in the collapsed condition where the front frame structure 116 is nested within the rear frame structure 114 and the down tube 150 lies alongside the seat tube 118. Since the concentric bottom bracket shell 126 and pivot 156 are disposed forward of the lower end 120 of the seat tube 118, the down tube 150 is closely accommodated alongside the seat tube when the frame is collapsed. In this embodiment the seat tube 118 has a contoured shape that conforms to a tire 204 of the rear wheel 104 and the down tube 150 has a corresponding contoured shape such that in the collapsed condition the down tube substantially follows the contoured shape of the seat tube. In other embodiments the seat tube 118 may have minimal or no curvature and the down tube 150 may be similarly configured such that the seat tube and down tube lie generally parallel when the frame 102 is collapsed.

The seat 110 and seat post 124 and the front wheel 108 may have been removed either prior to collapsing the bicycle frame 102, or after partially collapsing the frame as shown in FIG. 2B. Additionally in the embodiment shown, the handlebar 112 has been turned through approximately a right angle to cause the steerable front wheel mount 106 to lie generally in the x-y plane and to tuck the handlebar over the crossbar 158. As described above, the arms 170 and 172 are configured to clear the rear wheel 104, the rear sprocket 134, and drivetrain components such as the chain 136, as well as brake discs or drums, thus allowing the rear wheel 104 to remain mounted in the collapsed condition shown in FIG. 2C. In the embodiment shown, the wheel size of the rear wheel 104 and front wheel 108 may be the full size wheel for a road bike (i.e. a 700c wheel).

Figure 2D:
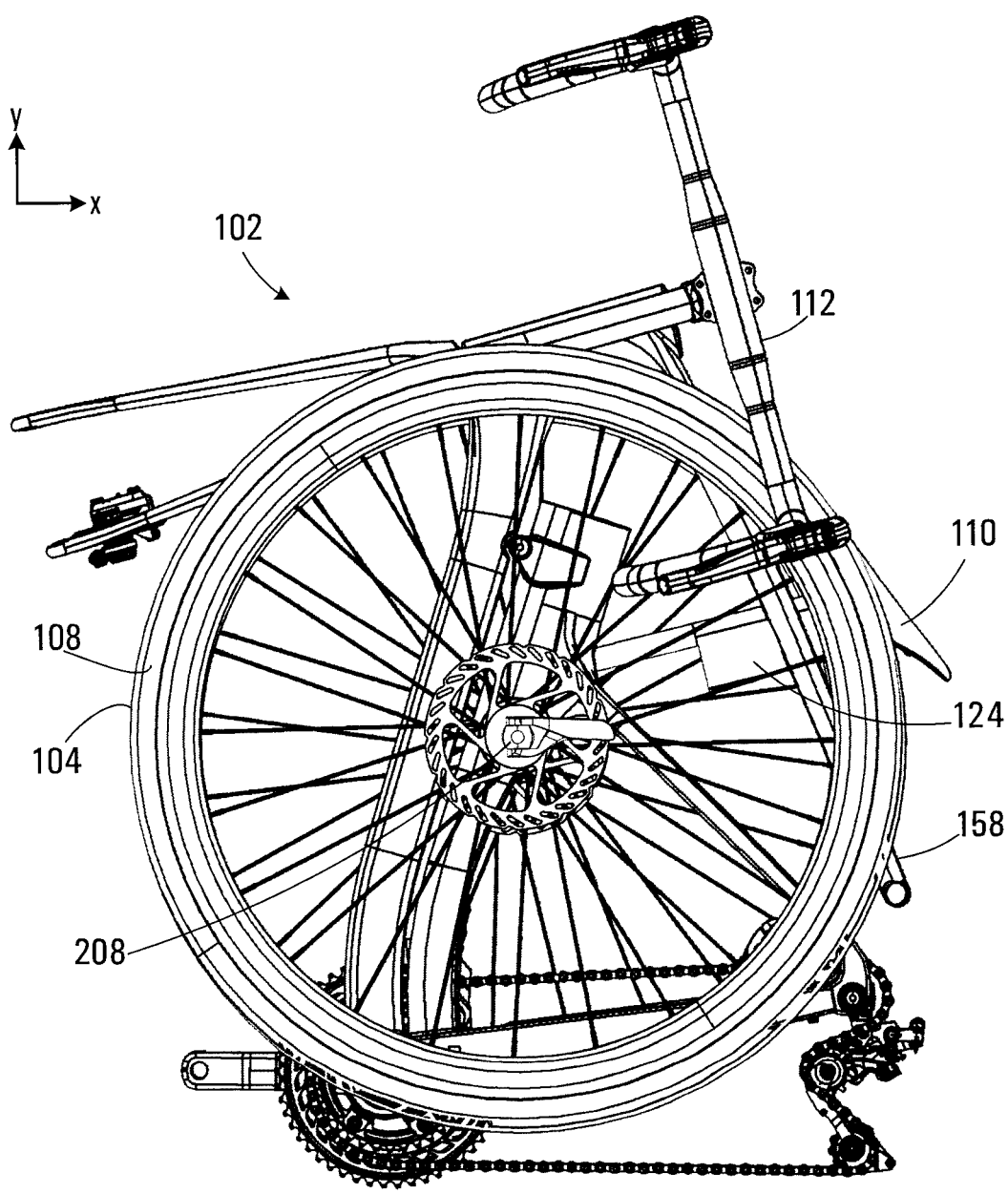
FIG. 2D is an elevational view of the bicycle shown in FIGS. 1A and 1B in a fully collapsed condition.

Still referring to FIG. 2C, the seat tube 118 includes a wheel retainer 206 mounted partway along the seat tube. In this embodiment the wheel retainer 206 is a laterally extending tubular bore through the seat tube 118 that may be threaded or otherwise configured to permit the rear wheel 104 and front wheel 108 to be secured to either side of the collapsed frame 102. Referring to FIG. 2D, the bicycle 100 is shown in a fully collapsed condition and packed for transport by securing the front wheel 108 to the frame 102 at the wheel retainer 206. The rear wheel 104 is secured to the wheel retainer 206 from the other side of the frame (shown behind the bicycle frame 102 and front wheel 108). The handlebar 112 is turned through approximately a right angle as shown in FIG. 2C and tucks in over the front wheel 108. In the embodiment shown the seat 110 and seat post 124 are inserted through the spacing in the crossbar 158 between the pair of arms 170 and 172 of the crossbar 158. In some embodiments the bicycle frame 102 may include a seat retainer, such as a tube sized to receive the seat 110 and seat post 124 for securing the seat 110 and seat 110 and seat post 124 to the collapsed frame.

With the frame 102 collapsed and packed as shown in FIG. 2D, the bicycle 100 becomes significantly more compact and less likely to attract excess baggage surcharges commonly levied by the airline for a conventional bicycle transport box or bag, which would have larger overall dimensions. Alternatively, the bicycle may be inserted into a soft shell bag that covers the drivetrain components and includes either a carry handle or backpack straps for carrying the bag. Such a bag may be convenient for transporting the bicycle 100 on public transport, for example.

For example, in embodiments where the front wheel 108 has a threaded through axle, the bore of the wheel retainer 206 may be threaded to receive and secure the wheel via the axle. The detached front wheel 108 is shown secured to the wheel retainer 206 in FIG. 2D via a quick release cam 208. Additionally, in some embodiments the rear wheel 104 may also be removed and secured to the wheel retainer 206 such that the rear wheel lies alongside one side of the collapsed frame 102 and the front wheel 108 lies alongside the other side of the frame. In some embodiments the front wheel 108 may optionally be removed prior to collapsing the frame 102 and the process shown in FIGS. 2A-2C may be performed with the front wheel 108 removed. The bicycle 100 in the collapsed condition shown in FIG. 2D has a significantly reduced extent in the x-y plane over the bicycle in the riding condition as shown in FIG. 1A. The handlebar 112 having been pivoted into the x-y plane also reduces the extent of the collapsed bicycle 100 in the y-z plane (i.e. into the page). This reduction in extents makes it easier to accommodate the collapsed bicycle 100 during transit or when in storage. Conventional bicycles are significantly more difficult to fit in vehicles or residential accommodations due to the length of the frame and protruding handlebars.

Referring back to FIG. 2A, in the embodiment shown the down tube 150 includes a frame retainer 180. As shown in FIG. 2C, when the frame 102 has been collapsed, the frame retainer 180 is disposed to align with the frame lock 162 such that the down tube 150 can be secured to the seat tube 118 at the frame lock. In the embodiment shown, an Allen head fastener is used to secure the frame retainer 180 to the frame lock 162. In some embodiments locking fasteners having a key or other locking device may be used to lock the frame in the collapsed condition to prevent deployment of the bicycle into the riding condition.

The bicycle 100 described above also includes common elements such as disc brakes, brake levers, etc. which are shown in the drawings but not described in detail herein. These components may be substituted for and/or omitted. Other components such as pedals are not depicted in the drawings but would be provided in an operational bicycle.

Figure 3:
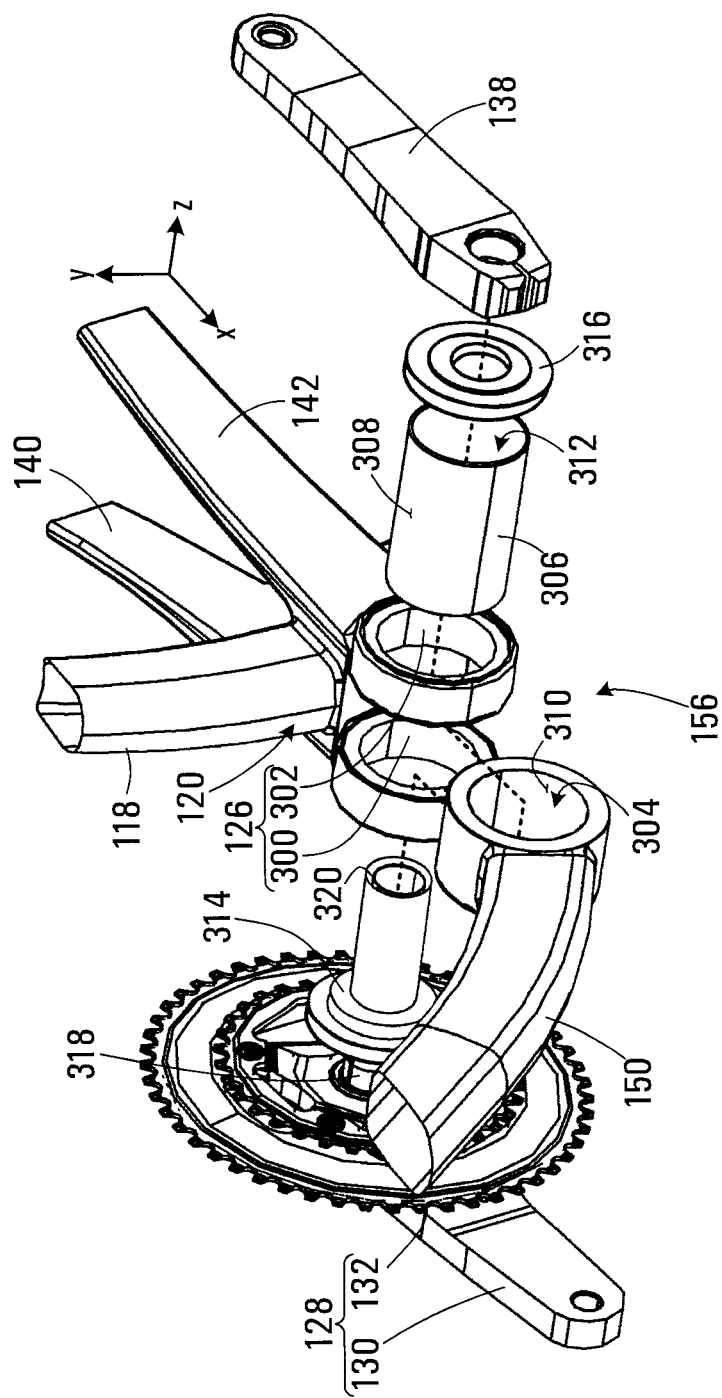
FIG. 3 is an exploded perspective view of a pivot and bottom bracket of the bicycle shown in FIG. 2A.

Referring to FIG. 3, the bottom bracket shell 126 and the pivot 156 are shown in exploded view along with portions of the down tube 150, seat tube 118, and the chainstays 140 and 142 surrounding the bottom bracket shell. In this embodiment the bottom bracket shell 126 includes a pair of cylindrical bores 300 and 302 laterally spaced apart and fixed to the lower end 120 of seat tube 118 and/or chainstays 140 and 142. The down tube 150 has a central cylindrical bore 304 that is sized to fit between the pair of cylindrical bores 300 and 302 such that the respective bores are aligned. The lateral dimension of the central cylindrical bore 304 may be selected to facilitate free pivoting of the pivot 156 while minimizing lateral movement between the pair of cylindrical bores 300 and 302.

The pivot 156 also includes a cylindrical sleeve 306 having an outer surface 308 sized to fit between the pair of cylindrical bores 300, 302 and the central cylindrical bore 304 to form the pivot 156. The outer surface 308 of the cylindrical sleeve 306 may be fixed within the cylindrical bores 300 and 302. For example, the outer surface 308 of the cylindrical sleeve 306 may be sized for an interference fit within the cylindrical bores 300 and 302 and pressed into place. The central cylindrical bore 304 may be sized for a sliding fit on the outer surface 308 of the cylindrical sleeve 306. Alternatively the sleeve 306 may be bonded in place using an epoxy, welded, braised, or secured via a threaded connection to the cylindrical bores 300 and 302. The outer surface 308 of the cylindrical sleeve 306 and an inner surface 310 of the central cylindrical bore 304 together act as a plain bearing or barrel pivot that permits pivoting in the x-y plane. The relatively large area of the bearing surfaces 308 and 310 prevents lateral flexing of the pivot 156 when the bicycle frame 102 is in the riding condition.

The cylindrical sleeve 306 has an inner bore 312 that may be sized and configured to receive any of a variety of bottom bracket assemblies commonly used for mounting the crankset 128 including threaded, press fitted, or bonded bottom brackets. In the embodiment shown the cylindrical sleeve 306 is configured to accommodate a two part bottom bracket having a right side 314 and a left side 316, each of which include bearings for rotatably receiving a spindle 318 of the crankset 128. When the right and left sides 314 and 316 of the bottom bracket are received and secured within the cylindrical sleeve 306, the spindle 318 of the crankset 128 is inserted through the bottom bracket and the left crank 138 received and secured on an end 320 of the spindle to hold the crankset in place.

In the illustrated embodiment of FIG. 3, the pair of cylindrical bores 300 and 302 are shown fixed to the lower end 120 of the seat tube 118 and forward ends of the chainstays 140 and 142 while the central cylindrical bore 304 is shown fixed to a lower end of the down tube 150. In other embodiments the pair of cylindrical bores may be fixed to the lower end of the down tube 150 and the central cylindrical bore fixed to the lower end 120 of the seat tube 118 and/or chainstays 140 and 142.

In all embodiments, the pivot 156 is substantially immobilized when the frame lock 162 is engaged. In some embodiments, the central cylindrical bore 304 on the down tube 150 may be implemented as a split collar where a fastener or fasteners are used to immobilize the bearing surfaces 308 and 310 within the bottom bracket shell 126 relative to each other. Alternatively, a set screw or other fastener may be received through the central cylindrical bore 304 and through the cylindrical sleeve 306 to immobilize the bearing surfaces of the pivot 156 while in the riding condition.

Figure 4A:
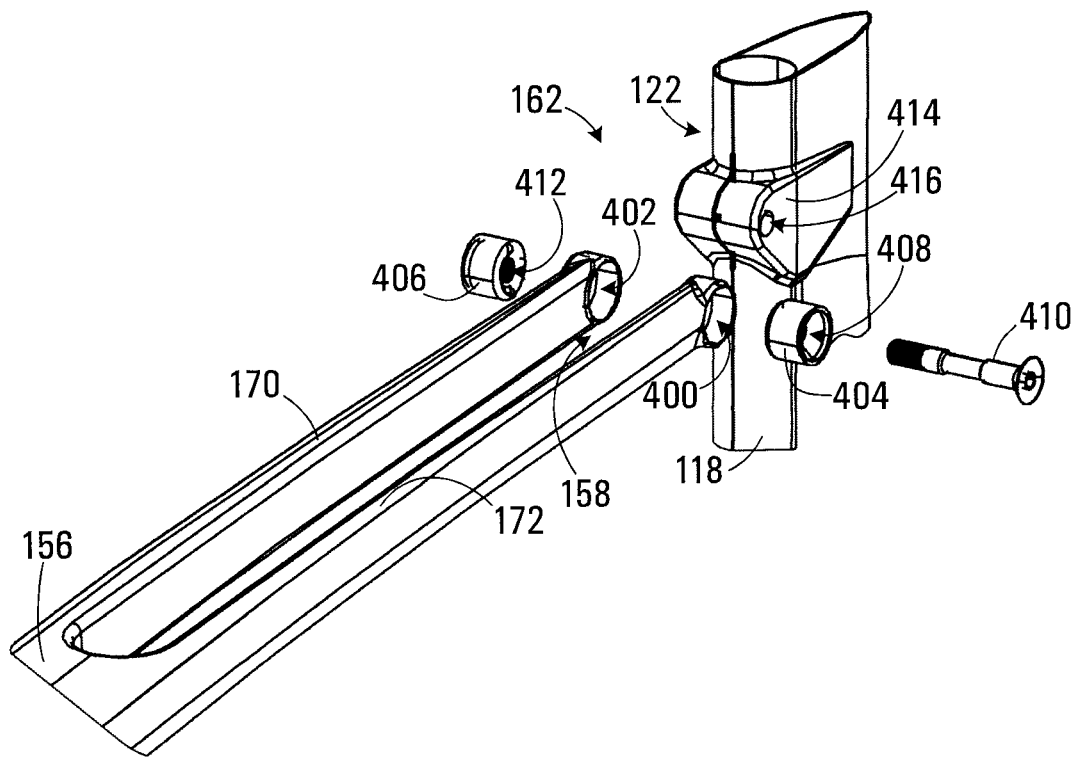
FIG. 4A is an exploded perspective view of a frame lock of the bicycle shown in FIG. 2A.

An example of one implementation of the frame lock 162 is shown in exploded view in FIG. 4A. In the embodiment shown the arms 170 and 172 of the crossbar 158 terminate at the rearward end 158 in a pair of laterally oriented cylindrical openings 400 and 402. The openings 400 and 402 are each sized to receive cylindrical inserts 404 and 406. In this embodiment where the crossbar 158 is formed from a composite carbon material, the cylindrical inserts 404 and 406 may be fabricated from an aluminum alloy material and bonded to the carbon material within the cylindrical openings 400 and 402. Carbon frames typically include metallic inserts at connections that will be subjected to higher loads. For other frame materials such as steel, aluminum or titanium, the inserts and openings may be fabricated as a unitary element. In this embodiment the cylindrical insert 404 has a hole 408 bored laterally through the insert, which is sized to receive a threaded fastener 410. The cylindrical insert 406 includes a hole 412 that is threaded to receive and secure the threaded fastener 410. The upper end 122 of the seat tube 118 includes a reinforced boss 414 having a hole 416 bored laterally through the boss and sized to permit the fastener 410 to be inserted through the hole.

Figure 4B:
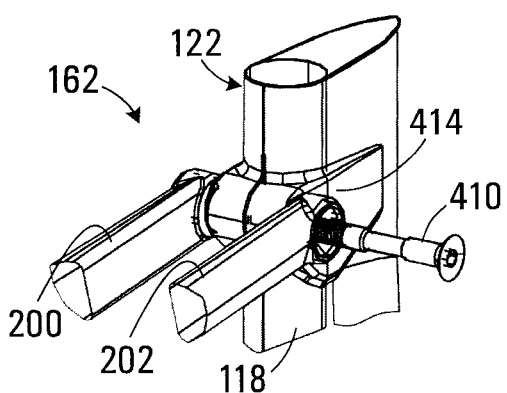
FIG. 4B is a perspective view of the frame lock shown in FIG. 4A in a partly engaged state.

Referring to FIG. 4B, to engage the frame lock 162 the crossbar 158 is aligned with the hole 416 in the boss 414 and the fastener 410 is inserted through the hole 408 in the cylindrical insert 404, through the hole 416 in the boss 414, and threaded into the threaded hole 412 in the cylindrical insert 406. The threaded fastener 410 may then be tightened using an Allen wrench to securely lock the crossbar 158 to the upper end 122 of the seat tube 118.

While the frame lock 162 is described above as being implemented using a threaded fastener to engage the lock, in other embodiments the frame lock may be implemented using a variety of different fasteners. For example, the threaded fastener may be replaced by a quarter-turn fastener or a quick release cam fastener, both of which would eliminate the need for an Allen wrench or other tool.

Urban Bicycle Frame

Figure 5A:
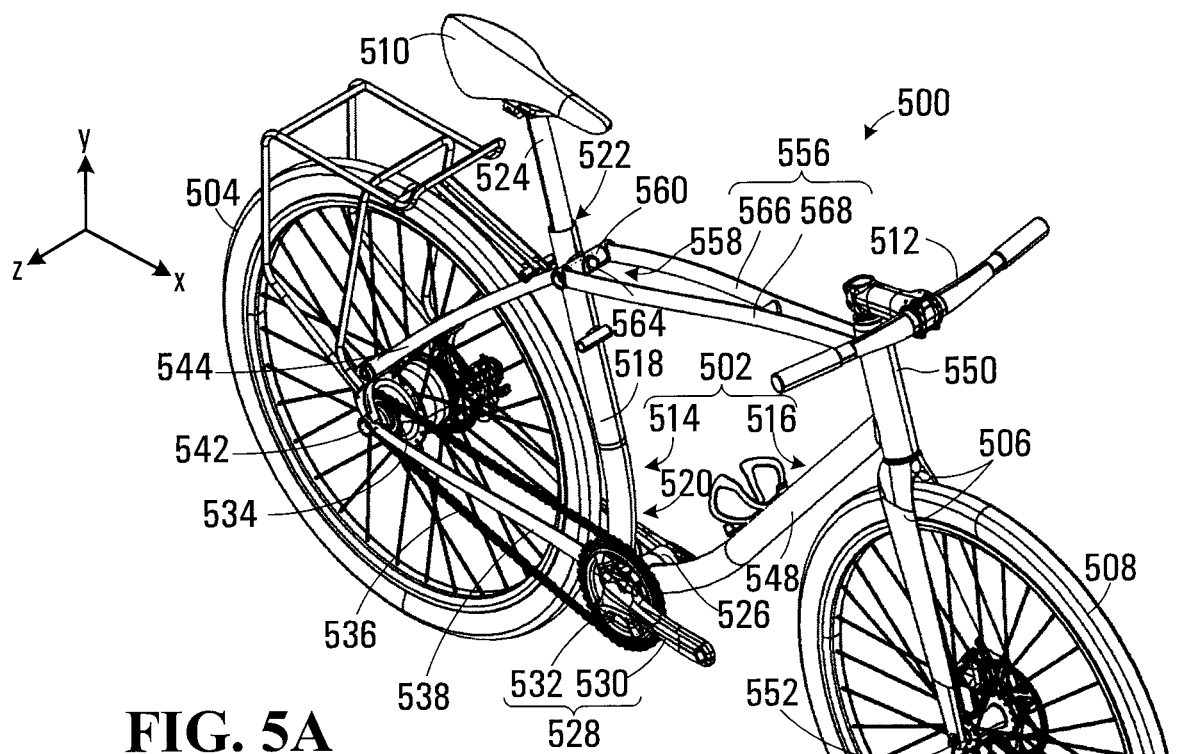
FIG. 5A is a right side perspective view of a bicycle in a riding condition in accordance with another disclosed embodiment.
Figure 5B:
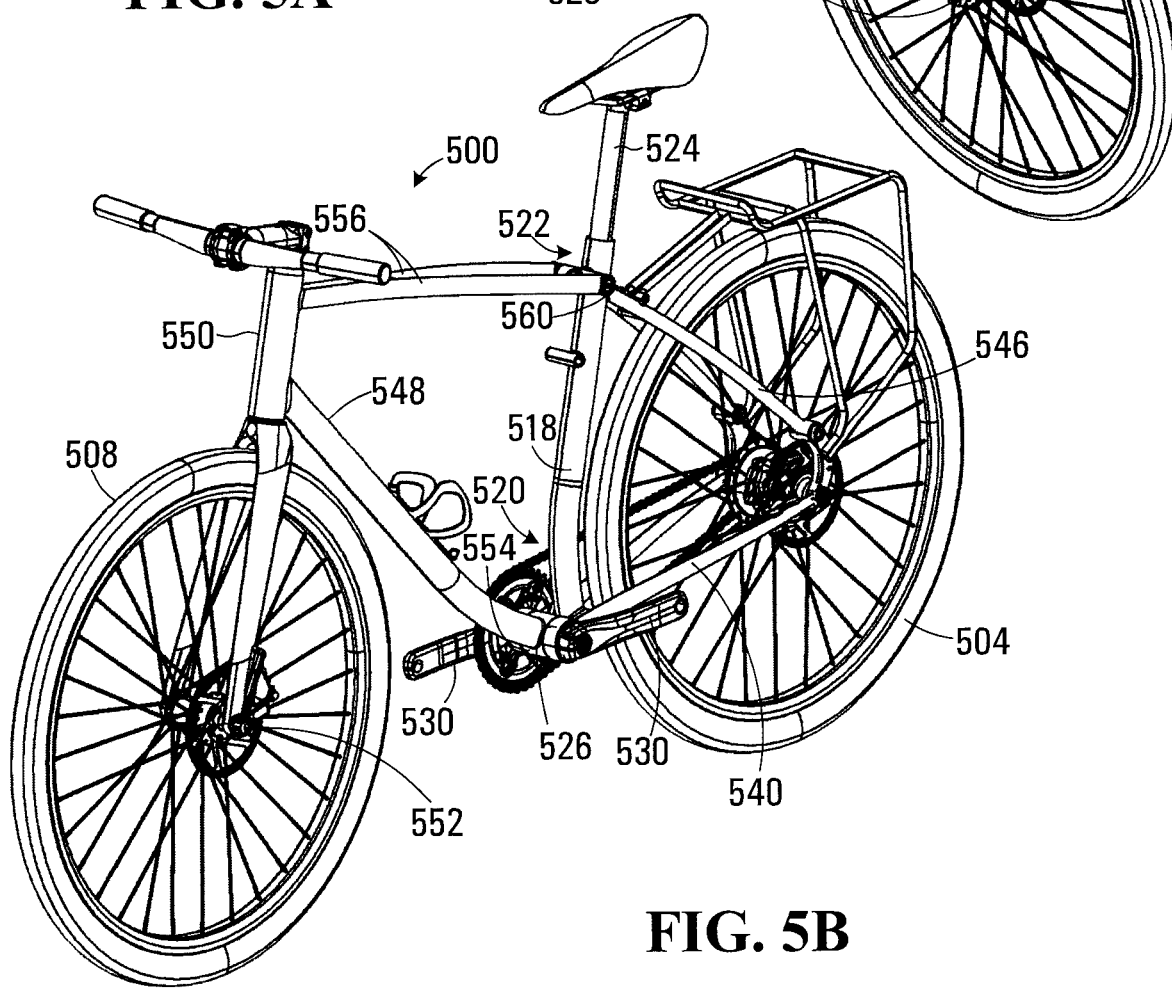
FIG. 5B is a left side perspective view of the bicycle in the riding condition shown in FIG. 5A.

Referring to FIG. 5A and FIG. 5B, a bicycle in accordance with another disclosed embodiment is shown generally at 500. The bicycle 500 includes a frame 502, a rear wheel 504, a steerable front wheel mount 506, a front wheel 508, and a seat 510. A handlebar 512 is coupled to the steerable front wheel mount 506 for turning the front wheel 508. The bicycle 500 and frame 502 is configured to generally correspond to a frame geometry and a wheel size associated with a conventional urban commuter bicycle, hybrid bicycle, or touring bicycle. In this embodiment the frame 502 is shown constructed from metal tubing (aluminum, steel, or titanium) having welded and/or brazed joints or connections. In other embodiments the frame 502 may be fabricated from a composite material such as a carbon fiber composite material. The bicycle 500 is shown in FIG. 5A and FIG. 5B from different sides with the frame 502 in a riding condition.

The bicycle frame 502 includes a rear frame structure 514 and a front frame structure 516. The rear frame structure 514 includes a seat tube 518 having a lower end 520 and an upper end 522. The upper end 522 is configured to receive a seat post 524 for mounting the seat 510. The rear frame structure 514 also includes a bottom bracket shell 526 that receives a bottom bracket for rotatably mounting a crankset 528. The bottom bracket is received inside the bottom bracket shell 526 and is not visible in FIG. 5A or 5B. In the embodiment shown, the crankset 528 includes a pair of cranks 530 connected to a chainring 532 that drives a rear sprocket 534 via a chain 536. The crankset 528, rear sprocket 534, and chain 536 together form a drivetrain of the bicycle 500. Pedals, which are generally selected in accordance with the rider's preference, are not shown mounted on the cranks 530 in FIG. 5.

The rear frame structure 514 also includes a pair of spaced apart chainstays 538 and 540 (visible in FIG. 5B) extending rearwardly and terminating in a rear wheel mount 542 for receiving the rear wheel 504. In the embodiment shown the rear wheel mount 542 is implemented as a through axle that is inserted laterally through a cylindrical dropout opening and through a lateral bore in the hub of the rear wheel 504. In other embodiments the wheel may be secured within c-shaped dropouts via wheel nuts or via a quick release lever and skewer that pass through a lateral bore in the hub of the wheel.

A forward end of each of the chainstays 538 and 540, the lower end 520 of the seat tube 518, and the bottom bracket shell 526 are rigidly connected proximate the bottom bracket shell to form the rear frame structure 514. In the embodiment shown the rear frame structure 514 also includes a pair of spaced apart seat stays 544 and 546 (shown in FIG. 5B) that each extend generally between the upper end 522 of the seat tube 518 and connect to one of the pair of chainstays 538 and 540.

The front frame structure 516 includes a down tube 548 rigidly connected to a forwardly disposed head tube 550. The head tube 550 is configured to receive the steerable front wheel mount 506, which terminates in a front wheel mount 552 for mounting the front wheel. The front wheel 508 may be mounted in a conventional forked dropout or via a through axle and may be secured by a quick release mechanism that permits the wheel 508 to be removed without tools.

The down tube 548 is connected to the rear frame structure 514 at a pivot 554, which in this embodiment is concentric with the bottom bracket shell 526. In other embodiments described later herein the pivot 554 may be proximate but not concentric with the bottom bracket shell 526. The pivot 554 facilitates pivoting of the front frame structure 516 with respect to the rear frame structure in a common vertical plane about the pivot (i.e. the x-y plane in FIG. 5A). The front frame structure 516 also includes a crossbar 556 spanning between the front frame structure and the rear frame structure 514 and configured to substantially immobilize the pivot 554 to place the frame in the riding condition shown in FIG. 5A and FIG. 5B. The crossbar 556 has a rearward end 558 configured to permit the front frame structure 516 to disconnect from the rear frame structure 514 for movement in the common vertical plane about the pivot 554, such that there is relative movement of the down tube 548 and the seat tube 518 towards each other about the pivot. In the embodiment shown, the rearward end 558 of the crossbar 556 is connected to the seat tube 518 at a frame lock 560. The frame lock 560 is disposed proximate the upper end 522 of the seat tube 518 in this embodiment.

When the rearward end 558 of the crossbar 556 is connected at the frame lock 560, the frame 502 is configured to place the bicycle 500 in the riding condition. In this embodiment, the crossbar 556 includes pair of arms 566 and 568 that are laterally displaced toward either side of the common vertical plane (i.e. the x-y plane). The pivot 554 and frame lock 560 are both configured to reduce lateral and vertical plane flexing such that the frame 502 behaves as a unitary frame.

Figure 6A:
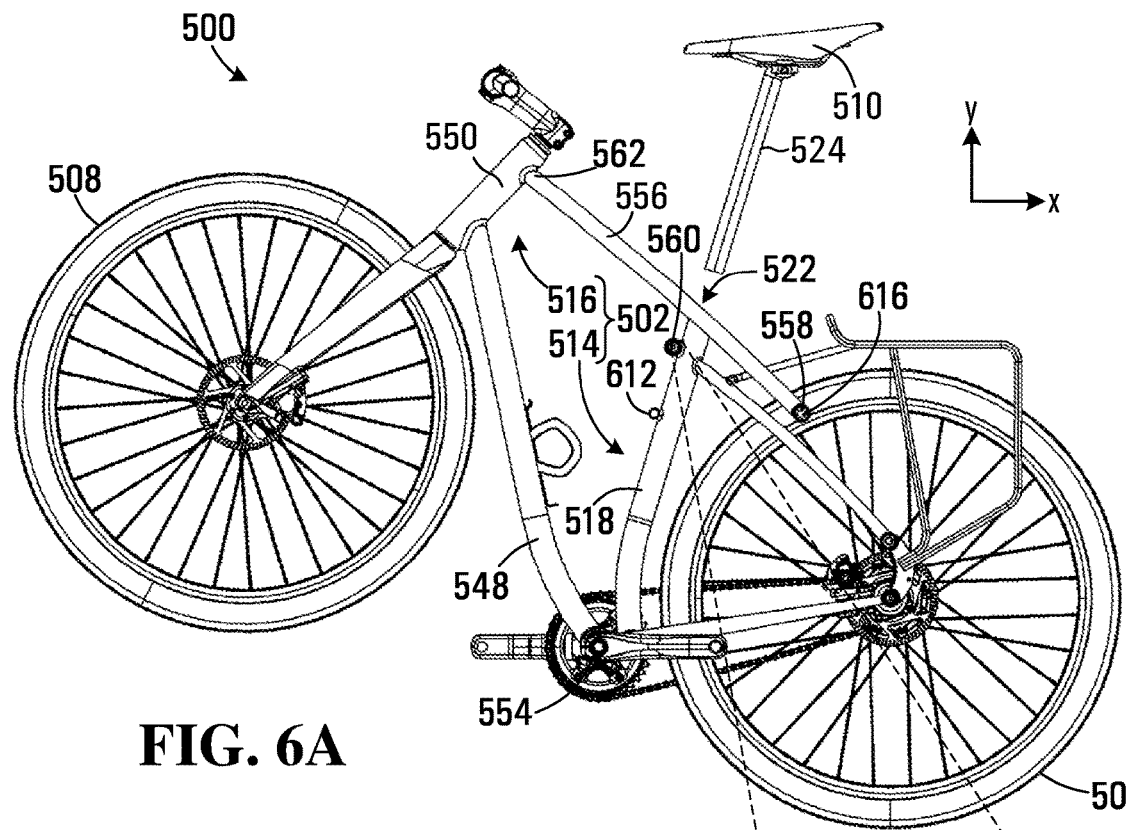
FIG. 6A is an elevational view of the bicycle shown in FIGS. 5A and 5B in a partially collapsed condition.

The bicycle 500 is shown in successive FIGS. 6A-6D while being collapsed to place the bicycle frame 502 in a fully collapsed condition. Referring to FIG. 6A, in this embodiment the seat 510 and seat post 524 is removed prior to collapsing the bicycle frame 502. The frame lock 560 is then disengaged to permit the front frame structure 516 to pivot toward the rear frame structure 514 in the common vertical plane about the pivot 554 such the down tube 548 and the seat tube 518 move towards each other about the pivot. The frame lock 560 is shown in more detail in an insert 680. The frame lock 560 is configured in a similar manner to the frame lock 162 described above in connection with the bicycle 100 but in this embodiment the arm 566 of the crossbar 556 is secured by a quarter turn fastener 682 having an end 684 that engages corresponding features 686 in a boss 688. The arm 568 of the crossbar 556 may be similarly secured by a quarter turn fastener (not shown).

In this embodiment the crossbar 556 has a forward end 562 fixed to the head tube 550 and the crossbar, head tube 550, and down tube 548 move together as a unitary structure. For a steel or aluminum bicycle frame 502 the fixed connection may be made by welding. Alternatively in some less conventional bicycles frames the crossbar 556 may be fixed to the down tube 548 rather than the head tube 550 or the rearward end 558 of the crossbar 556 may terminate at a location partway between the bottom bracket shell 526 and the upper end 522 of the seat tube 518 to provide a step through frame geometry shown later herein.

Figure 6B:
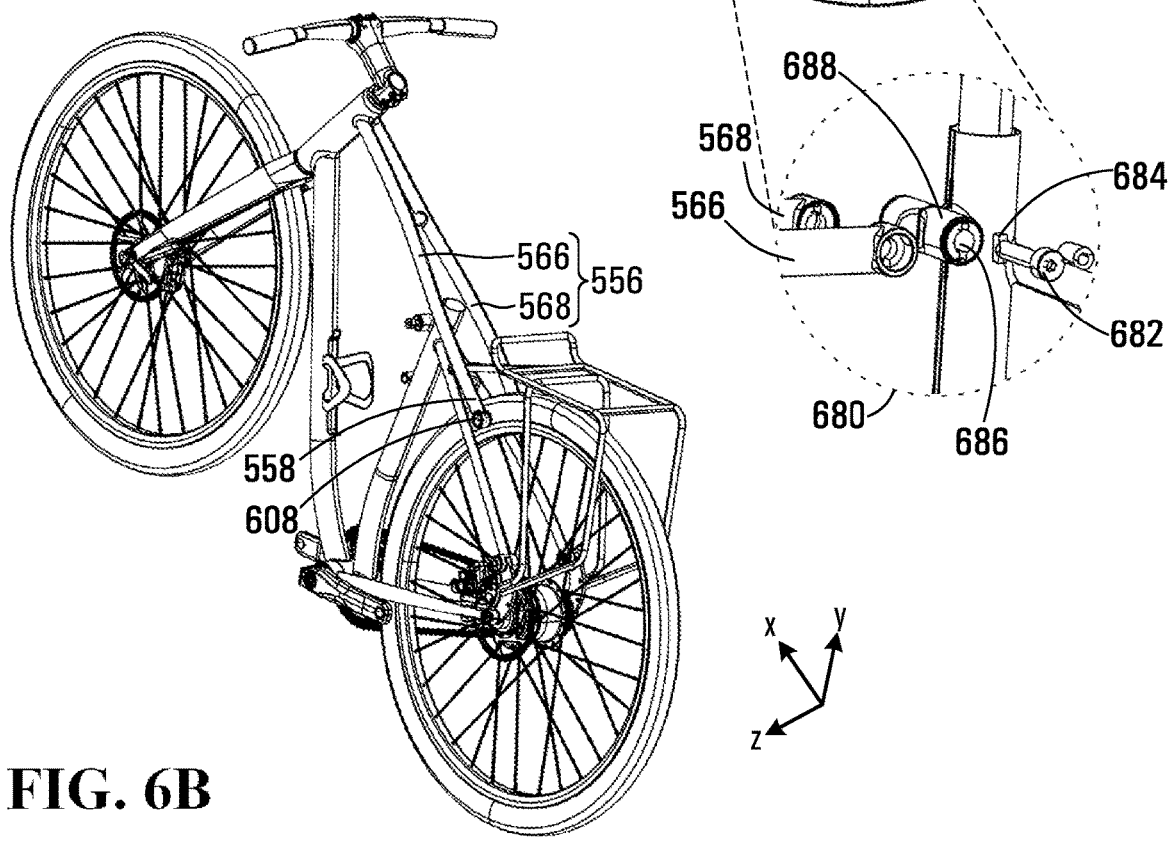
FIG. 6B is a rear perspective view of the partially collapsed bicycle shown in FIG. 5A.

Still referring to FIG. 6A, the frame 502 is shown in a partially collapsed condition where the down tube 548 has been moved toward the seat tube 518 and the rearward end 558 of the crossbar 556 has moved past the upper end 522 of the seat tube 518. Referring to FIG. 6B, the bicycle 500 is shown from a rear perspective in the same partially collapsed condition as shown in FIG. 6A. The arms 566 and 568 provide clearance between the crossbar 556 and the seat tube 518 while the front frame structure 516 is being pivoted toward the rear frame structure 514. In this embodiment the arms 566 and 568 also provide clearance between the crossbar 556 and the rear wheel 504, such that the rear wheel is able to remain mounted in the rear wheel mount 542 for collapsing the bicycle frame 502.

Figure 6C:
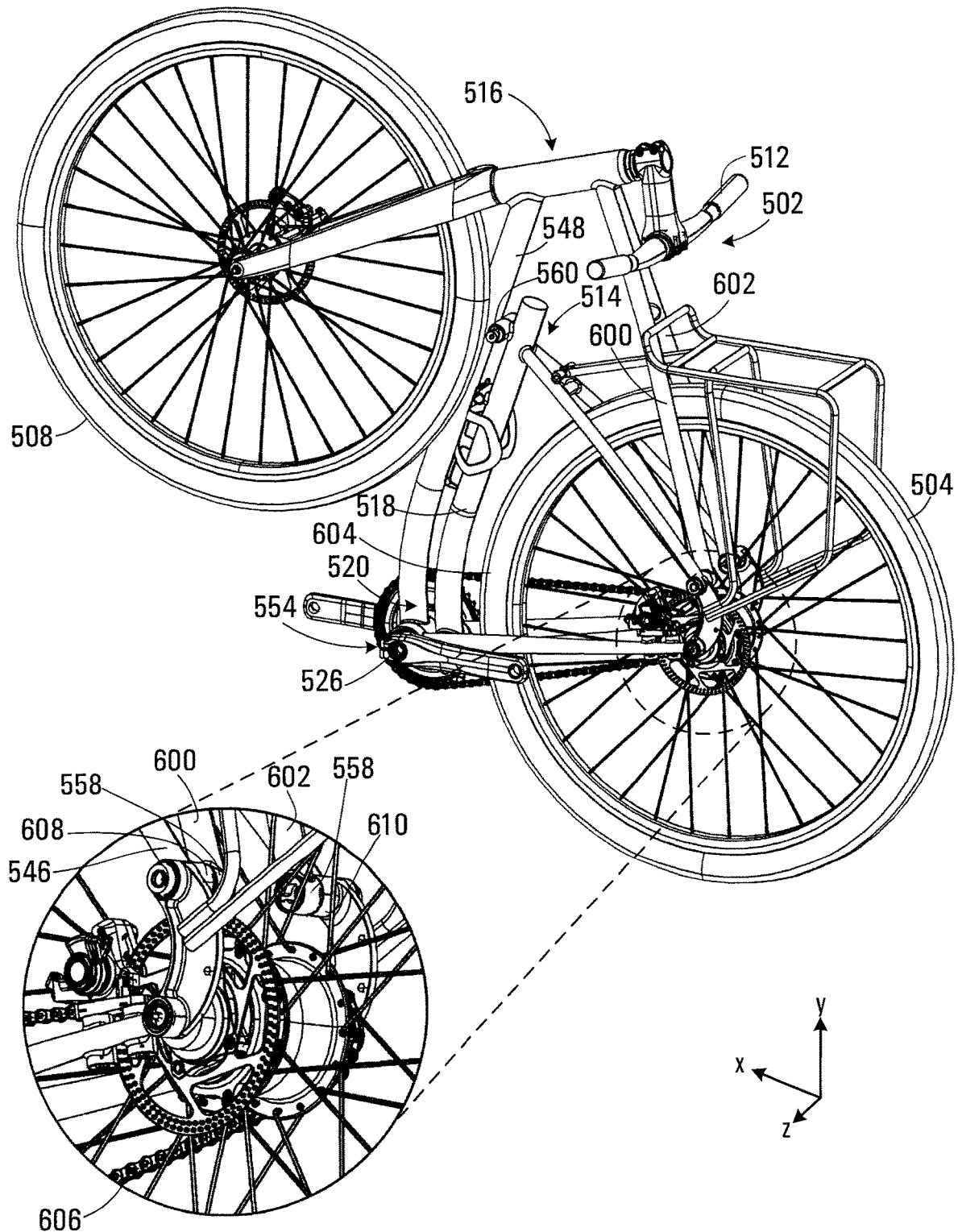
FIG. 6C is a perspective view of the bicycle shown in FIGS. 5A and 5B with the frame in a collapsed condition.

Referring to FIG. 6C, the bicycle frame 502 is shown in the collapsed condition where the front frame structure 516 is nested within the rear frame structure 514. Since the concentric bottom bracket shell 526 and pivot 554 are disposed forward of the lower end 520 of the seat tube 518, the down tube 548 is accommodated alongside the seat tube when the frame is collapsed. In this embodiment the seat tube 518 has a contoured shape that conforms to a tire 604 of the rear wheel 504 and the down tube 548 has a corresponding contoured shape such that in the collapsed condition the down tube substantially follows the contoured shape of the seat tube. Referring back to FIG. 5A, the frame lock 560 in this embodiment includes a notched portion 564. When the down tube 548 is pivoted toward the seat tube 518, the notched portion 564 allows the down tube lie closely spaced alongside the seat tube as shown in FIG. 6C.

The handlebar 512 has also been turned through almost 180° causing the front wheel 508 to rest against the side of the down tube 548. In other embodiments having a smaller wheel size or different shape of down tube the front wheel may tuck in line with the down tube. In some cases where the bicycle is being temporarily collapsed for some reason, the front wheel 508 may remain mounted after collapsing the frame 502 and the handlebar 512 turned through approximately 180° such that the front wheel lies alongside the front frame structure 516. The bicycle 500 in the collapsed position shown in FIG. 6C takes less time to return to the riding condition, since the wheels 508 and 504 remain mounted. In the embodi-embodiment shown the rear wheel 504 and front wheel 508 may be implemented as 650c size wheels, which are smaller than the road bike 700c wheels, but commonly used in urban commuter bicycles.

In this embodiment, the rear frame structure 514 includes a frame retainer for securing the front frame structure 514 to the rear frame structure 516 when in the collapsed condition. Referring to the insert 606 in FIG. 6C, the rear frame structure 514 includes inwardly oriented frame retainers 608 and 610, which in this embodiment are disposed on the respective seat stays 544 and 546. The arms 566 and 568 each terminate in laterally oriented cylindrical openings (one of which is visible at 616 in FIG. 6B). The frame retainers 608 and 610 are shown in the insert 606 in FIG. 6C engaging the respective cylindrical openings at the rearward end 558 of the crossbar 556. In this embodiment, the arms 566 and 568 pressed laterally inwardly by a small amount when engaging the frame retainers 608 and 610. Under these conditions, the arms 566 and 568 releasably secure the front frame structure 516 to the rear frame structure 514 in the collapsed condition. The ends of the arms 566 and 568 may be further secured in place by the quarter turn fasteners associated with the frame lock 560 and the frame retainers 608 and 610 may thus be similarly configured to the boss 688 of the frame lock.

As described above, the arms 566 and 568 are configured to clear the rear wheel 504, the rear sprocket 534, and chain 536, as well as brake rotors or drums, thus allowing the collapsed bicycle 500, which may be quite heavy to be easily wheeled by hand via the handlebar, with the rear wheel 504 in place. In this embodiment the bicycle 500 also includes the rear rack 616, which may be commonly used on urban commuter bicycles. The bicycle 500 in the collapsed condition permits the rack 616 to remain in place. Additionally, the rack 616 may be equipped with pannier supports for carrying panniers or saddlebags, and the saddlebags may also remain mounted once the frame 502 is collapsed.

Figure 6D:
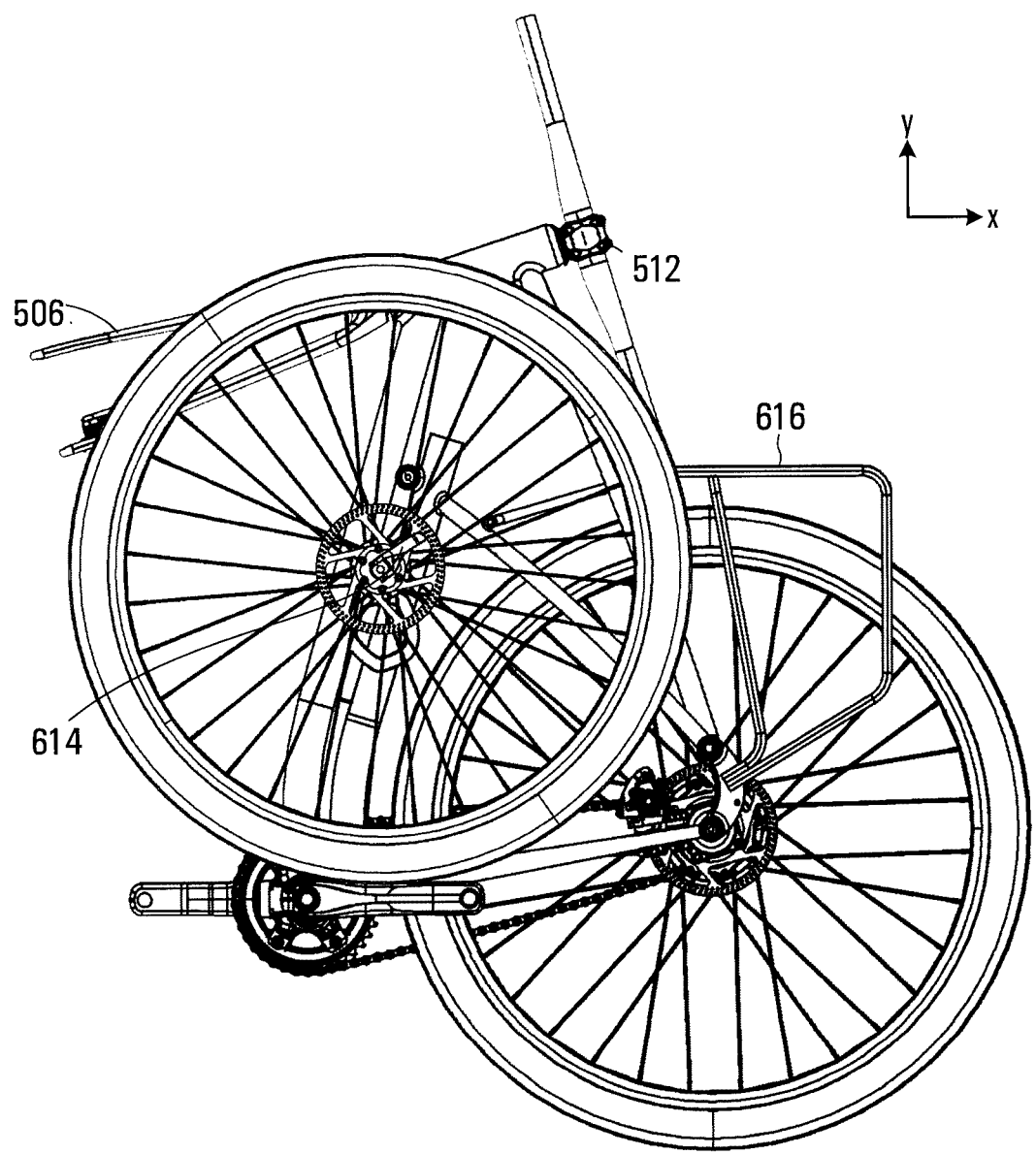
FIG. 6D is an elevational view of the bicycle shown in FIGS. 5A and 5B in a fully collapsed condition.

In the embodiment described above with reference to FIGS. 6A-6C, the front wheel 508 remains mounted while the frame 502 is collapsed, but in other embodiments the front wheel may be removed before or after collapsing the frame 502. Referring to FIG. 6D, once the frame has been collapsed as shown in FIG. 6C, the front wheel 508 may be removed from the front wheel mount 552 and the handlebar 512 turned through 90° to lie substantially within the common vertical plane (i.e. the x-y plane) or through or 180° such that the handlebar is located parallel to the crossbar 556, as shown in FIG. 6C.

Referring back to FIG. 6A, the seat tube 518 includes a wheel retainer 612 mounted partway between the lower end 520 and upper end 522. In this embodiment the wheel retainer 612 has a laterally extending tubular bore that may be threaded or otherwise configured to permit the front wheel 508 to be secured to the collapsed frame 502. For example, in embodiments where the front wheel 508 has a threaded through axle, the bore of the wheel retainer 612 may be threaded to receive and secure the wheel via the axle. The detached front wheel 508 is shown secured to the wheel retainer 612 in FIG. 6D via a quick release cam 614. Additionally, in some embodiments the rear wheel 504 may also be removed and secured to the wheel retainer 612 such that the rear wheel lies alongside one side of the collapsed frame 502 and the front wheel 508 lies alongside the other side of the frame. In some embodiments the front wheel 508 may optionally be removed prior to collapsing the frame 502 and the process shown in FIGS. 6A-6C may be performed with the front wheel 508 removed.

The bicycle 500 in the collapsed condition shown in FIG. 6D has a significantly reduced extent in the x-y plane over the bicycle in the riding condition as shown in FIG. 5A. The handlebar 512 having been pivoted into the x-y plane also reduces the extent of the collapsed bicycle 500 in the y-z plane (i.e. into the page). This reduction in extents makes it easier to accommodate the collapsed bicycle 500 during transit or when in storage. Conventional bicycles are significantly more difficult to fit in vehicles or residential accommodations due to the length of the frame and the protruding handlebars.

The bicycle 500 described above also includes common elements such as brakes, which are shown in the drawings but not described in detail herein. Some of these components may be substituted for and/or omitted. Other components such as brake levers, cables and pedals are not depicted in the drawings but would be provided in an operational bicycle.

Figure 6E:
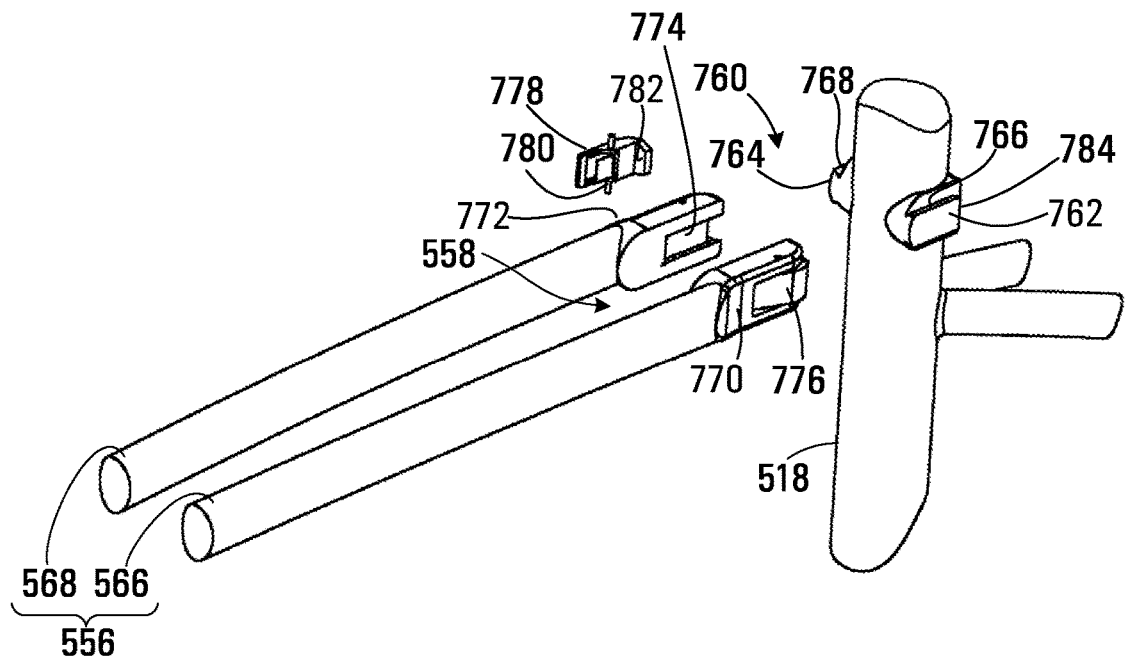
FIG. 6E is an exploded view of a frame lock in accordance with another disclosed embodiment.

Referring to FIG. 6E, an alternative embodiment of a frame lock is shown at 760. The frame lock 760 may be implemented on either the bicycle 100 or the bicycle 500 or other bicycles and frames described herein. The frame lock is described in with reference to the frame 502 of the bicycle 500, described above. In this embodiment the frame lock 760 includes a reinforced boss 762 on the left side of the seat tube 518 and a reinforced boss 764 on the right side of the seat tube. Each boss 762, 764 includes a respective dovetail slide 766 and 768. The arms 566 and 568 of the crossbar 556 each terminate in a latch 770 and 772. The latches each have a dovetail recess (774 for the right side latch) that corresponds to the dovetail slide 768 on the boss 764. The latches 770 and 772 also each include a sprung cam lock 776 and 778. The cam lock 778 for the right hand side arm 568 is shown detached and includes a pivot pin 780 and a locking tab 782. The sprung cam lock 776 is similarly configured.

To engage the frame lock 760 the ends of the arms 566 and 568 are aligned with the dovetail slides 766 and 768 on the boss 762, 764 and the cam locks 776 and 778 are depressed to move the locking tab 782 laterally away from the seat tube 518. The dovetail recesses of each of the latches 770 and 772 are then pushed into engagement with the dovetail slides 766 and 768. When the recess is fully engaged the locking tabs of the cam locks 776 and 778 engage ends (784 for the boss 762) to engage the frame lock.

Figure 7:
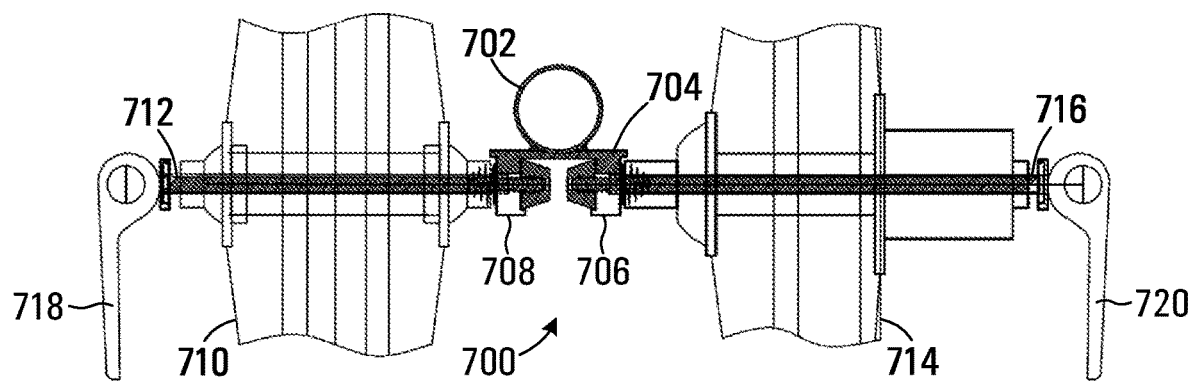
FIG. 7 is a cross sectional view of a wheel retainer of the bicycle shown in FIGS. 5A and 5B.

Referring to FIG. 7, an embodiment of a wheel retainer that may be used to secure wheels having integral hubs and conventional quick-release skewer mechanisms is shown in cross sectional view in FIG. 7 at 700. In this embodiment the wheel retainer 700 is welded to a tube 702, such as the seat tube 518 of the bicycle 500 shown in FIG. 5A and FIG. 5B. The wheel retainer 700 includes a lateral support plate 704 and a pair of spaced apart dropouts 706 and 708 that are thicker versions of the dropouts of the front wheel mount 552 and rear wheel mount 542 that would be used to mount the respective wheels. A front wheel 710 is secured to the dropout 708 using a quick release skewer 712. Similarly a rear wheel 714 is secured to the dropout 706 using a quick release skewer 716. The respective cams 718 and 720 are locked to hold the front wheel 710 and rear wheel 714 on either side of the tube 702. In other embodiments where the wheel is mounted using a through axle, the dropouts 706 and 708 may be replaced with threaded openings.

Figure 8A:
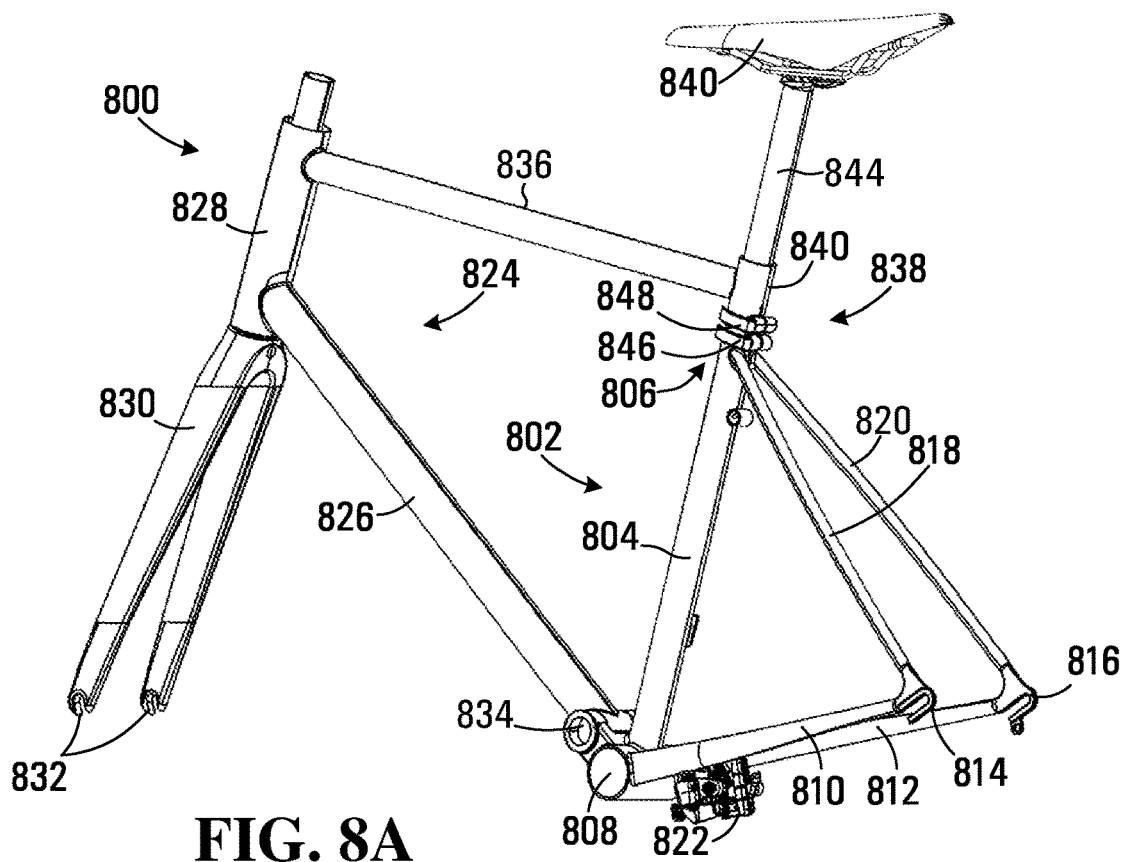
FIG. 8A is a perspective view of a bicycle frame in accordance with another disclosed embodiment.
Figure 8B:
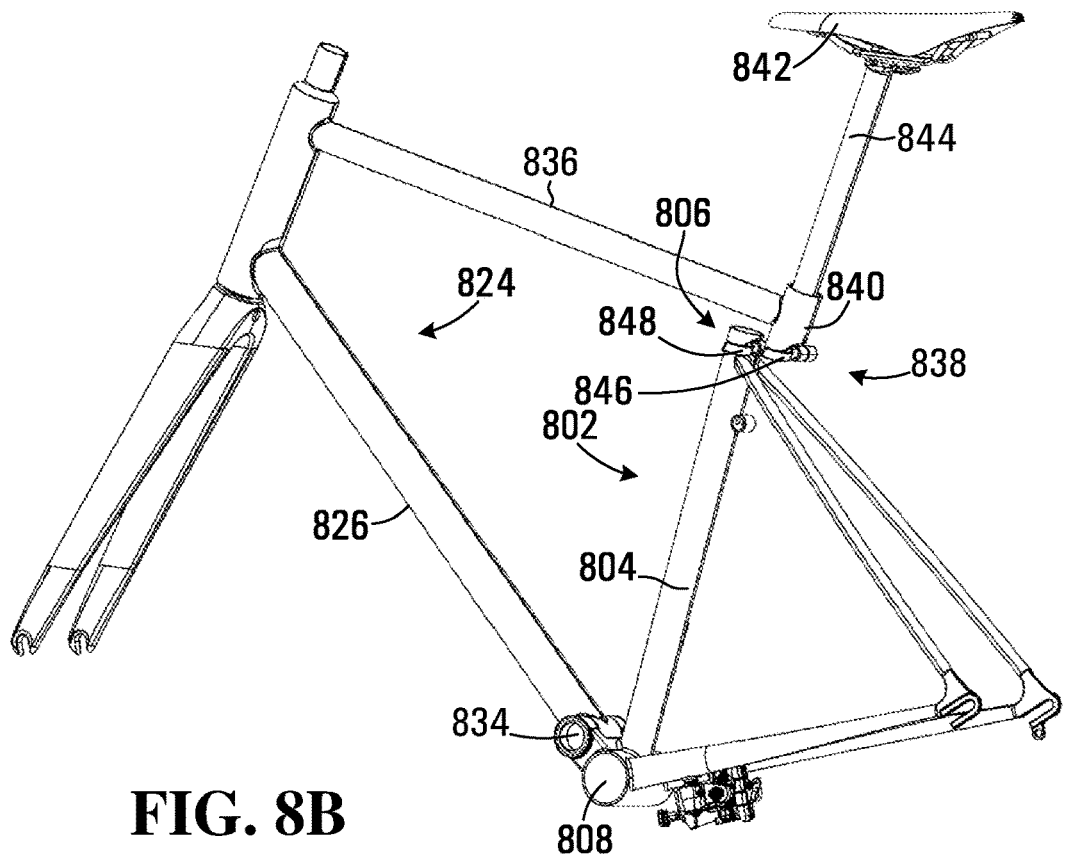
FIG. 8B is a perspective view of the bicycle frame of FIG. 8A in a partially collapsed condition.
Figure 8C:
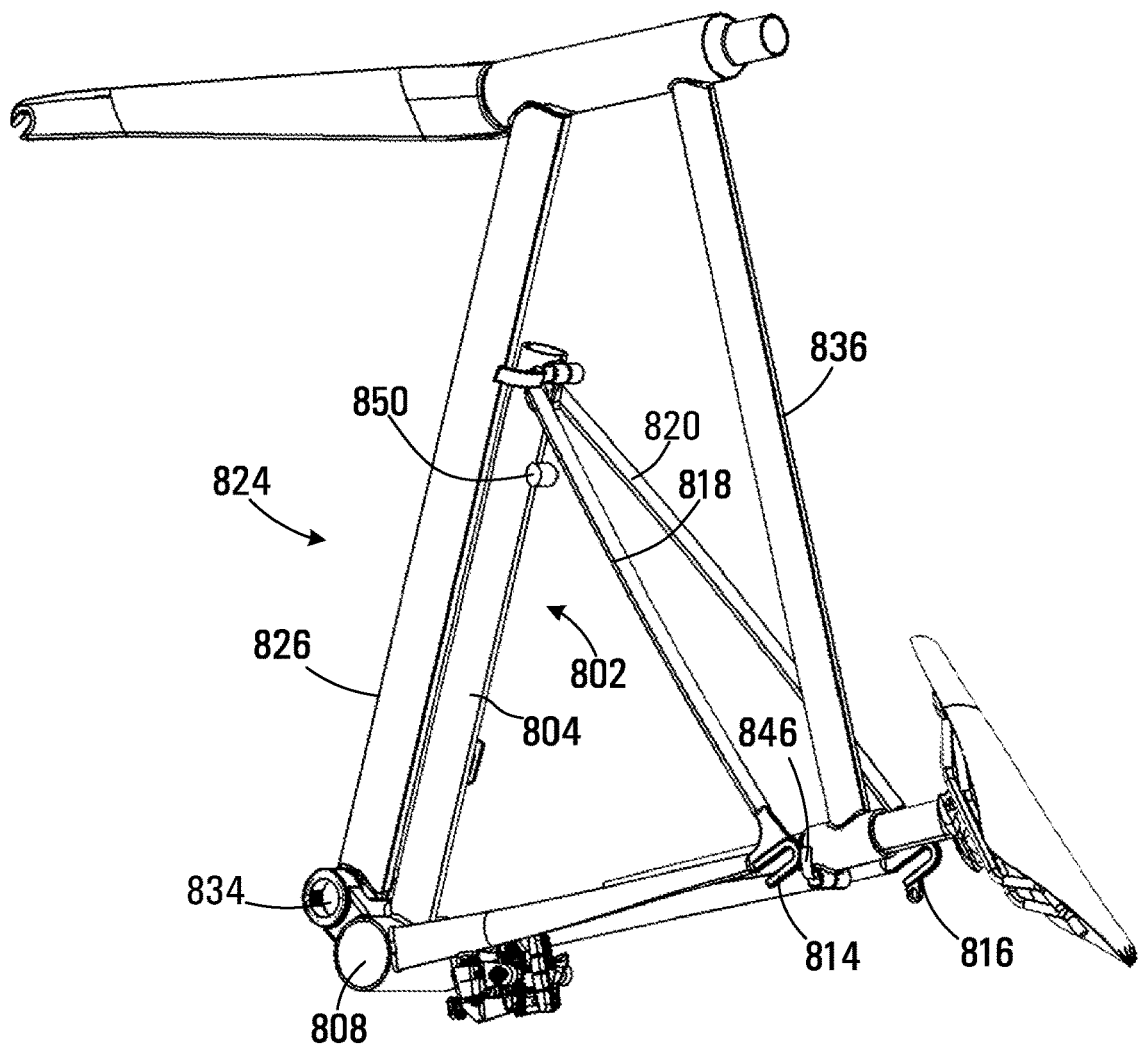
FIG. 8C is a perspective view of the bicycle frame of FIG. 8A in a fully collapsed condition.

Referring to FIGS. 8A-8C, a bicycle frame in accordance with another disclosed embodiment is shown generally at 800. The frame 800 is shown in a riding condition but without wheels, drivetrain, handlebars and other elements that make up a bicycle. The frame 800 includes a rear frame structure 802 including a seat tube 804 which is connected to a bottom bracket shell 808 at its lower end. A pair of chainstays 810 and 812 extend from the bottom bracket shell 808 and terminate in a pair of dropouts 814 and 816 for mounting a rear wheel. A pair of seat stays 818 and 820 extend between an upper portion of the seat tube 804 and connect to the respective chainstays 810 and 812 at the dropouts 814 and 816. In this embodiment, a brake calliper 822 is mounted to an underside of the chainstays 810 and 812.

The frame 800 also includes a front frame structure 824 having a down tube 826 supporting a forwardly disposed head tube 828. The head tube 828 receives a steerable front wheel mount 830, which terminates in a front wheel mount 832 for mounting a front wheel. The down tube 826 is connected to the rear frame structure 802 at a pivot 834. The pivot 834 is disposed adjacent to and forward of the bottom bracket shell 808. The front frame structure 824 also includes a crossbar 836 spanning between the front frame structure and the rear frame structure 802.

The frame 800 also includes a frame lock 838, which includes a length of tube 840 disposed at the rearward end of the crossbar 836. The length of tube 840 is oriented to align with an upper end 806 of the seat tube 804 when the frame 800 is in the riding condition. The length of tube 840 effectively extends the upper end of the seat tube 804. The bicycle shown in FIG. 8C also includes a saddle 842 supported on a seat post 844 and the seat post is inserted through the length of tube 840 and is secured within the upper end 806 of the seat tube 804 by a first cam lock 846 on the seat tube. The length of tube 840 has a second cam lock 848 for locking the crossbar 836 and length of tube 840 to the seat post 844. When the seat post 844 is inserted through the length of tube 840 into the upper end 806 of the seat tube 804 and the first and second cam locks 846 and 848 are engaged, the frame 800 is locked in the riding condition and the pivot 834 is substantially immobilized. Other fasteners may be used in place of the first and second cam locks 846 and 848.

The frame 800 is shown in FIGS. 8B and 8C while being collapsed to place the frame in a collapsed condition. Referring to FIG. 8B, when the first and second cam locks 846 and 848 are released, the seat post 844 and saddle 842 may be raised within the seat tube 804 and length of tube 840 to just clear the upper end 806 of the seat tube. This allows the front frame structure 824, the crossbar 836 and the length of tube 840, the seat post 844 and saddle 842 to pivot rearwardly about the pivot 834 such that the down tube 826 and the seat tube 804 are able to move towards each other. Once the length of tube 840 clears the upper end 806 of the seat tube 804, the seat post 844 may be lowered secured in place by the first cam lock 846.

Referring to FIG. 8C, the frame 800 is shown in a fully collapsed condition where the down tube 826 is lying alongside the seat tube 804 and the crossbar 836 and length of tube 840 are disposed between the pair of seat stays 818 and 820 proximate the dropouts 814 and 816. In this embodiment the seat tube 804 has minimal or no curvature and the down tube 826 may be similarly configured such that the seat tube and down tube lie generally parallel when the frame 800 is collapsed.

In this embodiment the rear wheel would be removed prior to collapsing the frame 800 since the length of tube 840 and the crossbar 836 would be prevented from pivoting fully if the rear wheel were left in place. The frame 800 further includes a wheel retainer 850, which may be used to secure the wheels to either side of the frame as described above in connection with other embodiments.

Figure 8D:
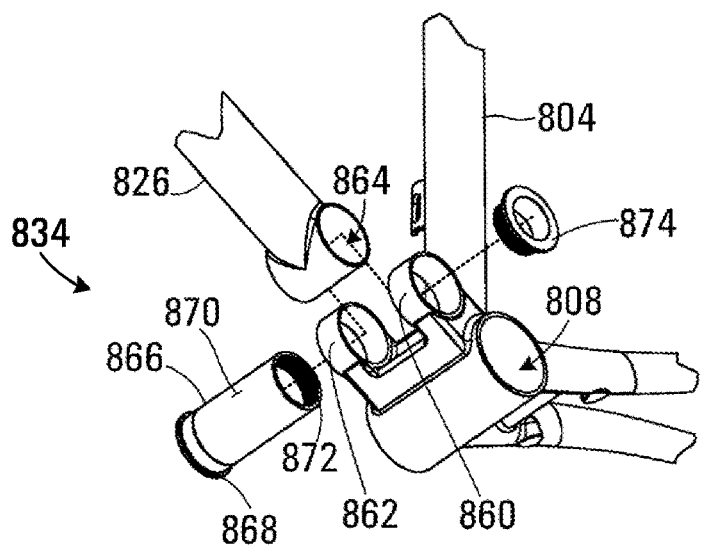
FIG. 8D is an exploded view of a pivot of the bicycle frame of FIG. 8A.

The pivot 834 of the frame 800 is shown in exploded view in FIG. 8D. Referring to FIG. 8D, the pivot includes a pair of cylindrical bores 860 and 862 that are spaced apart laterally. The down tube 826 has a central cylindrical bore 864 sized to be received between the pair of cylindrical bores 860 and 862. A cylindrical sleeve 866 having a flange 868 and outer surface 870 is inserted through the bore 860, the central bore 864, and the bore 860. The cylindrical sleeve 866 has an internal threaded portion 872 and a correspondingly threaded flanged cup 874 is threaded into the end of the cylindrical sleeve 866 to secure the cylindrical sleeve in place. The outer surface 870 of the cylindrical sleeve 866 acts as a bearing surface to facilitate pivoting of the down tube 826 with respect to the seat tube 804, as described above in connection with FIG. 3. The bottom bracket shell 808 is located rearwardly with respect to the pivot 834 and may receive any one of a variety of bottom brackets for rotatably mounting a crankset.

Step Through Bicycle Frame

Figure 9:
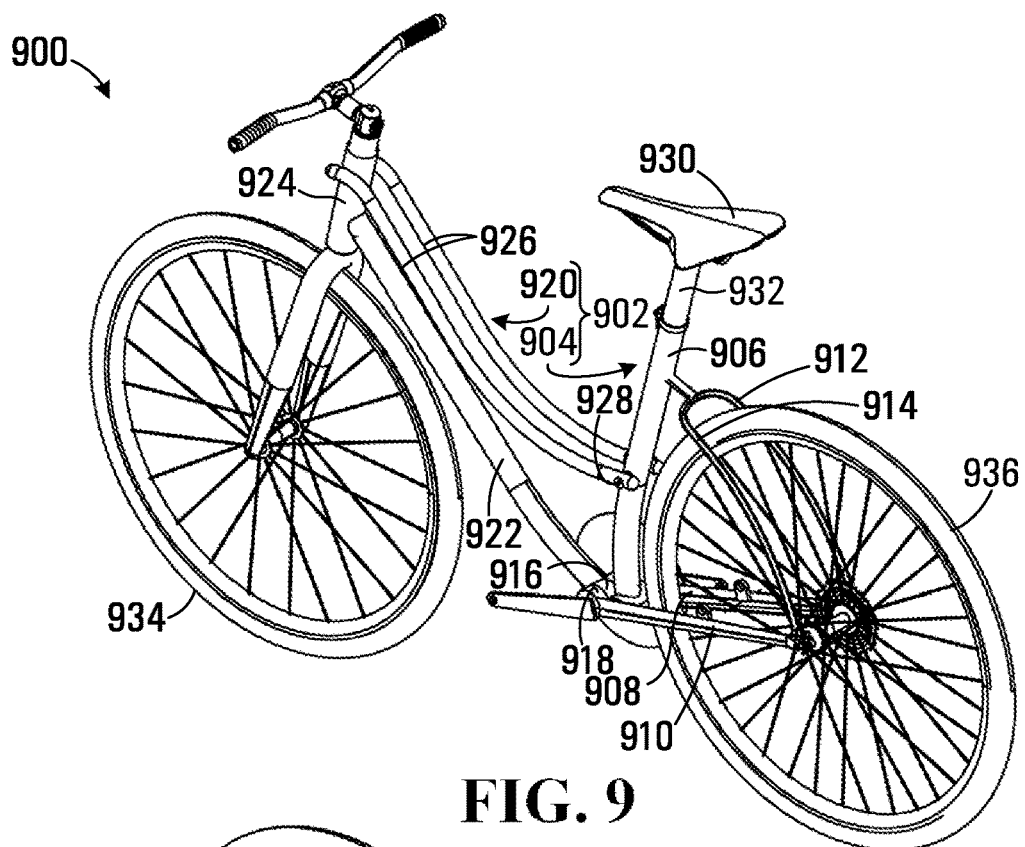
FIG. 9 is a perspective view of a bicycle in accordance with another disclosed embodiment.

Referring to FIG. 9, a bicycle in accordance with another disclosed embodiment is shown generally at 900. The bicycle 900 has a frame 902 is shown in a riding condition and is configured generally as described for the urban commuter bicycle 500 shown in FIGS. 5A and 5B. The frame 902 has a rear frame structure 904 including a seat tube 906, chainstays 908 and 910, seatstays 912 and 914, and a concentric pivot 916 and bottom bracket 918 connected to the seat tube and/or chainstays. The frame 902 also includes a front frame structure 920 including a down tube 922 fixed to a head tube 924 at its forward end. The front frame structure 920 also includes a crossbar 926 having spaced apart arms. In this embodiment the crossbar 926 is fixed to the head tube 924. The frame 902 also includes a frame lock 928, but in this embodiment the frame lock is disposed partway down the seat tube 906 to provide a step-through frame format. The bicycle 900 includes usual bicycle components including a saddle 930 and seat post 932, a front wheel 934, a rear wheel 936 and a drivetrain.

Figure 10:
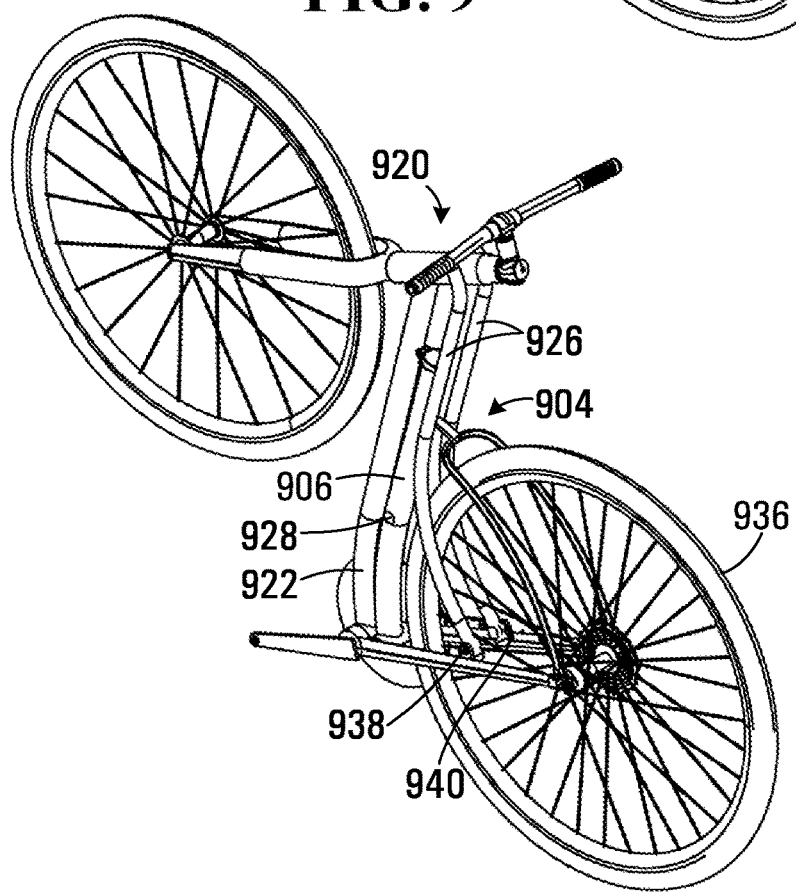
FIG. 10 is a perspective view of the bicycle of FIG. 9 in a collapsed condition.

Referring to FIG. 10, when the frame lock 928 is disengaged and the saddle 930 and saddle 930 and seat post 932 removed, the front frame structure 920 is able to pivot with respect to the rear frame structure 904 such that the down tube 922 moves toward the seat tube 906 and lies alongside the seat tube when the frame 902 placed in the collapsed condition. The arms of the crossbar 926 clear the rear wheel 936 and drivetrain components and may be secured to frame retainers 938 and 940 disposed on the respective chainstays 908 and 910.

Figure 11:
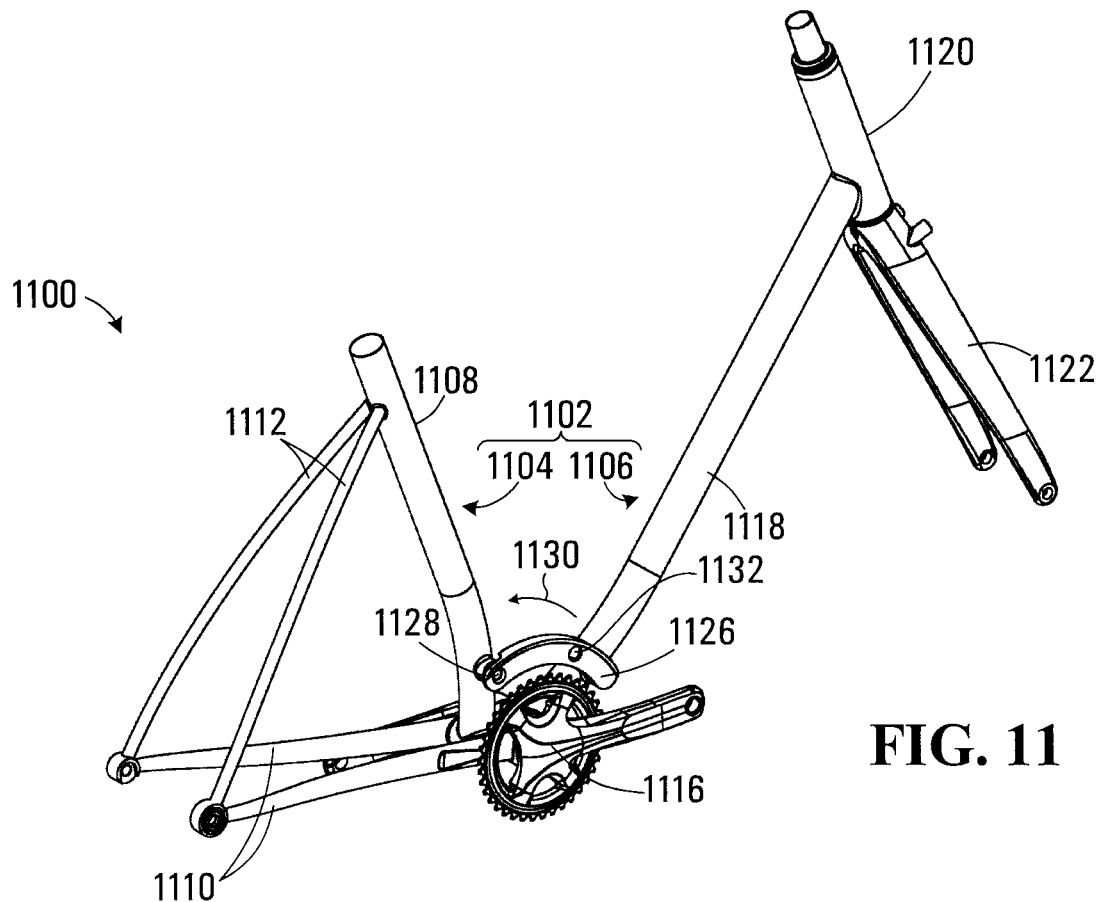
FIG. 11 is a perspective view of a bicycle in accordance with yet another disclosed embodiment.

Referring to FIG. 11, a bicycle in accordance with a further disclosed embodiment is shown generally at 1100 in a riding condition. The bicycle 1100 has a frame 1102, including a rear frame structure 1104 and a front frame structure 1106. The rear frame structure 1104 includes a seat tube 1108, chainstays 1110, and seat stays 1112 as generally described above in connection with other disclosed embodiments. A rear wheel (not shown) may be mounted at a rearward end of the chainstays 1110 and driven via a drivetrain coupled to a crankset 1116. The front frame structure 1106 includes a down tube 1118 fixed to a head tube 1120 that receives a steerable front wheel mount 1122 for mounting a front wheel (not shown). In this embodiment the front frame structure 1106 is connected to the rear frame structure 1104 at a pivot, which is not visible in FIG. 11 but is concentric with the bottom bracket that rotatably supports the crankset 1116. The frame 1102 further includes a frame lock, which in this embodiment is configured as a brace 1126 having one end fixed to the down tube 1118. The brace 1126 has an arcuate shape that generally follows the contour of chainrings of the crankset 1116. The other end of the brace 1126 is locked to the seat tube 1108 at a frame lock 1128. When the brace 1126 is locked to the frame lock 1128, the frame 102 is secured in the riding condition as shown in FIG. 11 and the pivot is immobilized. In other embodiments the brace 1126 may be fixed to the seat tube 1108 and the frame lock 1128 may be disposed on the down tube 1118. In the embodiment shown, there is no crossbar and the pivot is immobilized by the brace 1126 when locked to the seat tube 1108 at the frame lock 1128.

Figure 12:
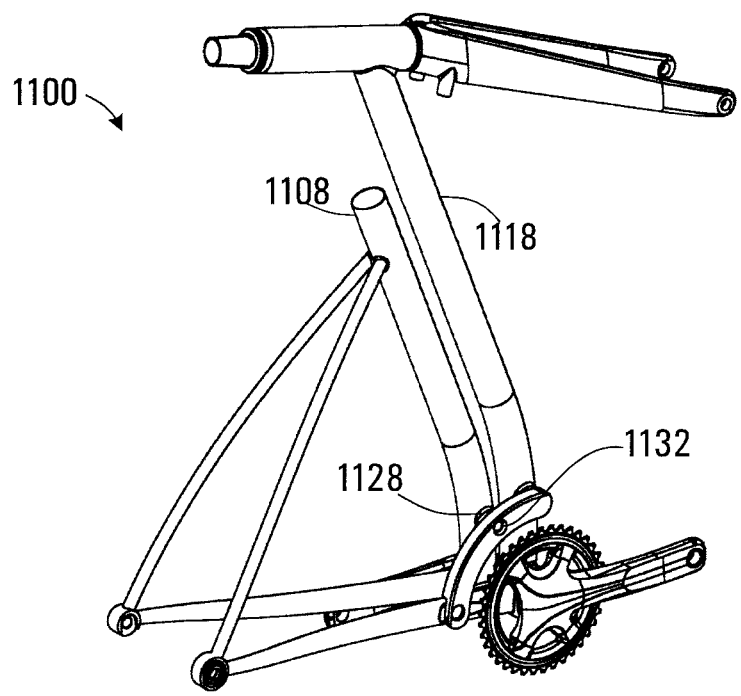
FIG. 12 is a perspective view of the bicycle of FIG. 11 in a fully collapsed condition.

Referring to FIG. 12, the bicycle 1100 is shown in a fully collapsed and packed condition where the frame 1102 has been collapsed. To place the frame 1102 in the collapsed condition, the frame lock 1128 is disengaged and the down tube 1118 is rotated in the direction of the arrow 1130 toward the seat tube 1108. A frame retainer 1132 on the brace 1126 engages the frame lock 1128 to secure the frame in the collapsed condition.

Bicycle Packing for Transport

Figure 13A:
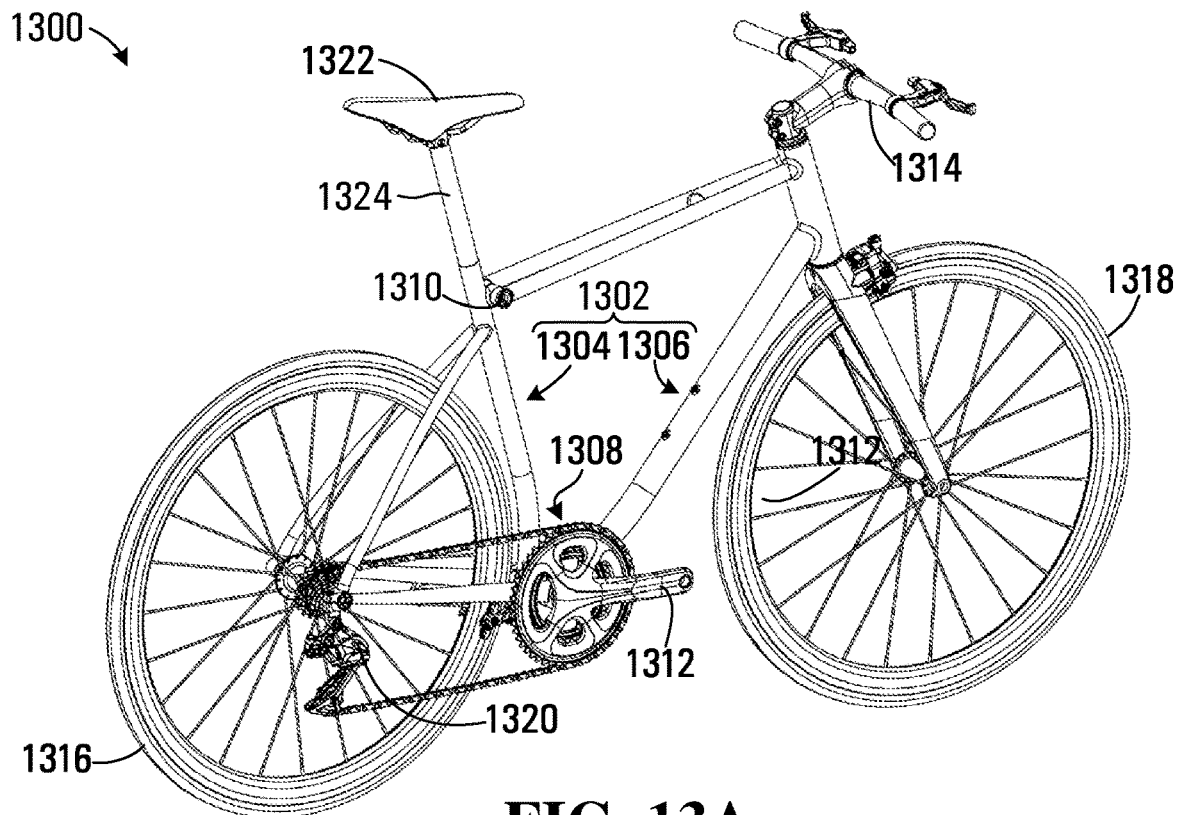
FIG. 13A is a perspective view of a road bicycle in accordance with another disclosed embodiment.

Airlines generally have a maximum linear dimension above which an item would be subject to excess baggage charges. This maximum linear dimension is calculated from the sum of the Length, Height and Width dimensions (i.e. L+H+W). A common maximum linear dimension is 158 cm (or 62 inches in imperial units). Referring to FIG. 13A, a bicycle in accordance with another disclosed embodiment is shown generally at 1300. The bicycle 1300 is a road bicycle configured with caliper brakes rather than disc brakes and has a frame 1302 including a rear frame structure 1304 and a front frame structure 1306 connected to the rear frame structure at a pivot 1308. The pivot 1308 is immobilized by a frame lock 1310, which when disengaged facilitates relative movement of the front frame structure 1306 and the pivot 1308 toward each other to collapse the frame 1302 as described above in connection with other disclosed embodiments. The bicycle includes a pair of cranks 1312, a straight handlebar 1314, a rear wheel 1316 and a front wheel 1318, a rear derailleur 1320, and a seat 1322 mounted on a seat post 1324.

Figure 13B:
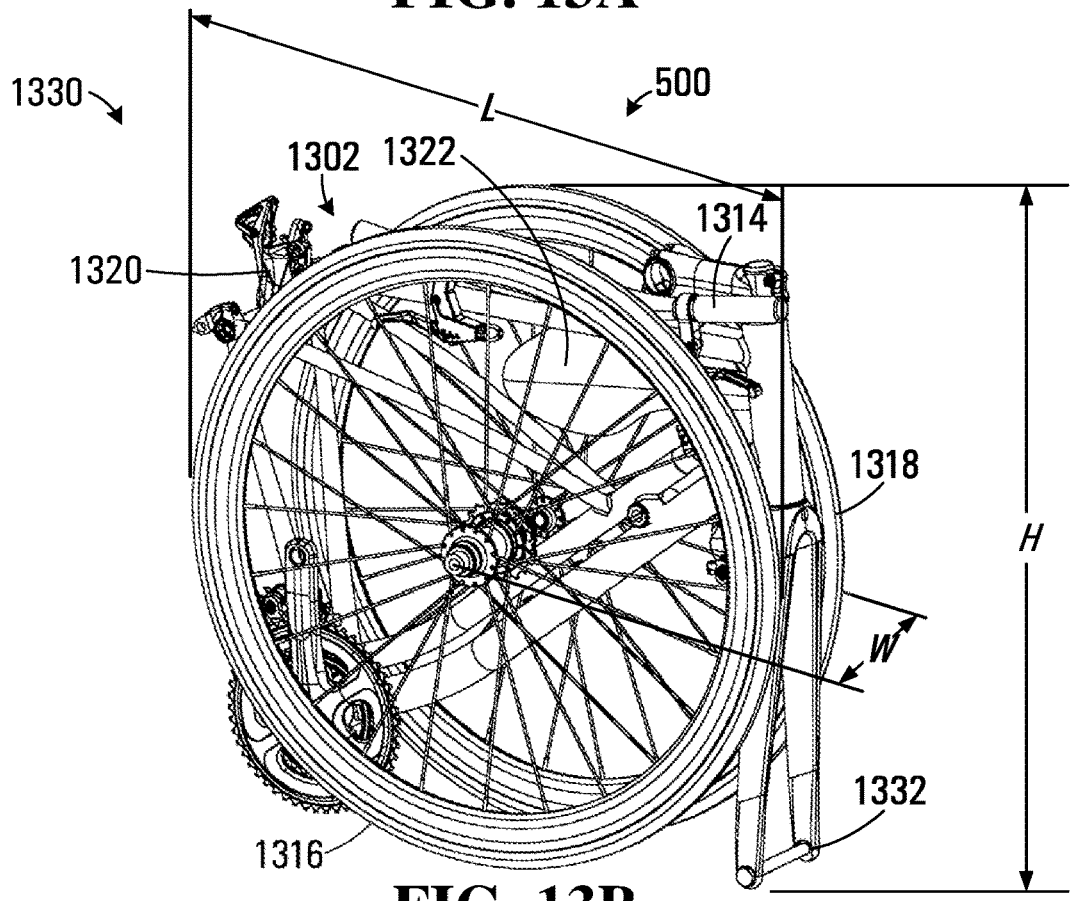
FIG. 13B is a perspective view of the road bicycle shown in FIG. 13A in a fully collapsed and packed condition.

Referring to FIG. 13B, the bicycle 1300 is shown packed for airline travel or shipment at 1330 having Length (L), Height (H), and Width (W) dimensions as indicated. The left hand side crank 1312, the handlebar 1314, the rear wheel 1316 and the front wheel 1318 are detached. For airline travel the tires on the wheels 1316 and 1318 are required to be deflated. In this embodiment the rear derailleur 1320 remains in place, but may be removed to prevent sensitive components being bent or damaged during shipping. The frame lock 1310 is disengaged and the frame 1302 is collapsed and packed in order starting with the front wheel 1318, the bicycle frame 1302, the handlebar 1314, and then the rear wheel 1316. The aforementioned elements of the packed bicycle 1330 may be held together using a skewer or rod. The seat 1322 and seat post 1324, and the left hand crank 1312 may be inserted into a space between the wheels and secured along with the pedals (not shown in FIGS. 13A and 13B) if removed from the cranks. The resulting maximum linear dimension of the packed bicycle 500 for a 56 cm frame size would fit within most common airline restrictions on standard checked baggage. Most bicycles would also fall within the applicable weight restrictions (typically 23 kg).

Figure 14A:
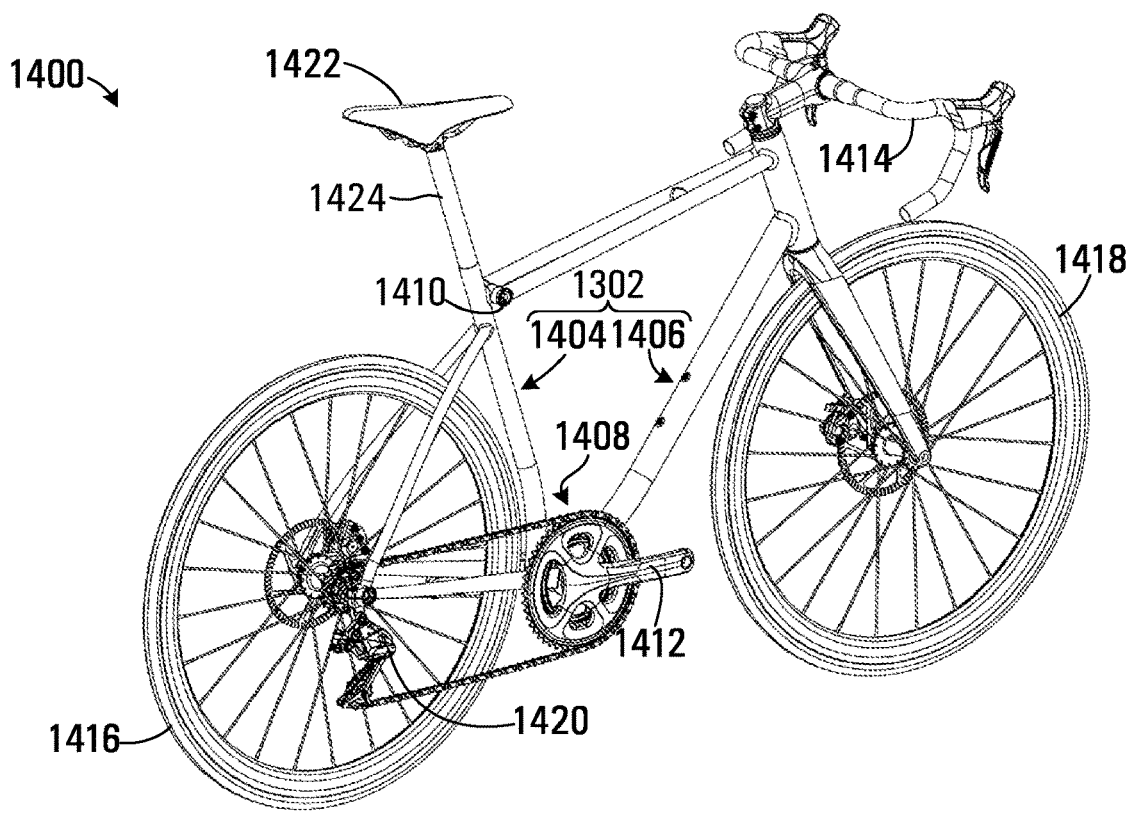
FIG. 14A is a perspective view of a road bicycle in accordance with a further disclosed embodiment.

Referring to FIG. 14A, a bicycle in accordance with another disclosed embodiment is shown generally at 1400. The bicycle 1400 is a road bicycle configured with disc brakes and having a frame 1402 including a rear frame structure 1404 and a front frame structure 1406 connected to the rear frame structure at a pivot 1408. The pivot 1408 is immobilized by a frame lock 1410, which when disengaged facilitates relative movement of the front frame structure 1406 and the pivot 1408 toward each other to collapse the frame 1402 as described above in connection with other disclosed embodiments. The bicycle includes a pair of cranks 1412, a drop handlebar 1414, a rear wheel 1416 and a front wheel 1418, a rear derailleur 1420, and a seat 1422 mounted on a seat post 1424.

Figure 14B:
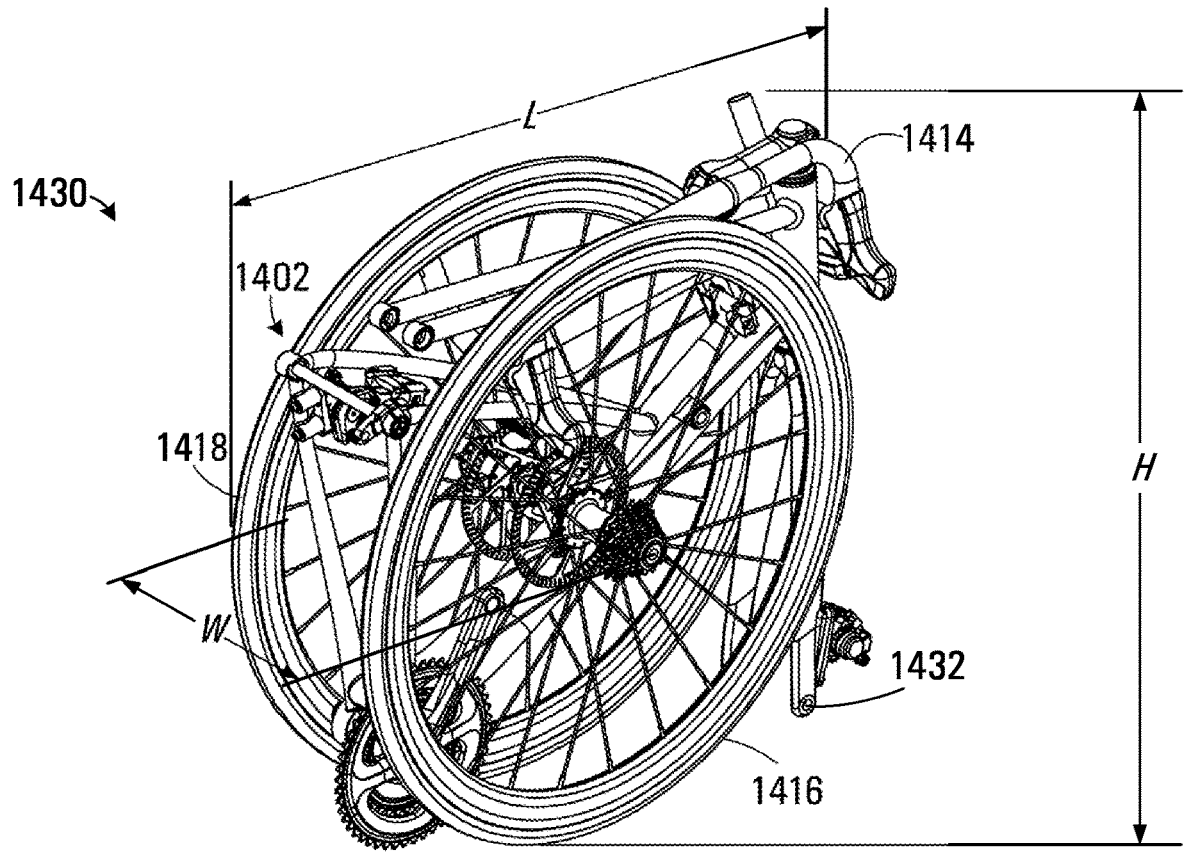
FIG. 14B is a perspective view of the road bicycle of FIG. 14A in a fully collapsed and packed condition.

Referring to FIG. 14B, the bicycle 1400 is shown packed for airline travel or shipment at 1430 having Length (L), Height (H), and Width (W) dimensions as indicated. The left hand side crank 1412, the handlebar 1414, the rear wheel 1416 and the front wheel 1418 are detached. If necessary, the wheels 1416 and 1418 may be deflated, the pedals removed (not shown in FIGS. 14A and 14B) and the rear derailleur 1420 is detached from its hanger. The frame lock 1410 is disengaged and the frame 1402 is collapsed and packed in order starting with the front wheel 1418, the bicycle frame 1402, the handlebar 1414, and then the rear wheel 1416. The seat 1422 and seat post 1424, and the left hand crank 1412 may be inserted into a space between the wheels and secured along with the pedals if removed from the cranks.

Either of the packed bicycles 1330 or 1430 shown in FIG. 13B or FIG. 14B may be placed in a custom hardshell box or padded bag that protects the components of the bicycles during shipment. Frame sizes larger than a 56 cm frame may be more difficult to collapse and pack into the permitted linear dimension. Additionally, to protect the ends 1332 and 1432 of the steerable front wheel mounts of the bicycles 1300 and 1400, a set of small wheels (for example such as used for wheeling luggage) may be mounted to the fork ends. The wheels would have a dual function of allowing the packed bicycles to be wheeled and also protecting the wheel mounts from damage during transport.

Any of the bicycle embodiments described above in FIGS. 1A-2D, FIGS. 5A-6E, FIGS. 8A-8c, FIGS. 9-12, FIG. 13A and FIG. 14A may be applied to an electric bicycle (e-bike) having an integrated electric motor used for propulsion. While embodiments disclosed above include a road bicycle and urban commuter or touring bicycles, the disclosed collapsing frames may also be applied to other bicycle configurations including hybrid bicycles, a fat bicycle having oversize wheels and tires, cyclocross bicycles and other frame variants. The above disclosed embodiments may also be applied to mountain bicycles such as a cross country mountain bicycle having an internally geared or single speed hub with a rear suspension.

The above disclosed collapsible bicycle embodiments have the advantage of conforming to conventional frame sizes and geometry and when in the riding condition would be virtually indistinguishable from a convention non-collapsible frame bicycle having a similar frame type. The disclosed embodiments further have the advantage that the frames may be quickly collapsed to reduce the extents of the bicycle without detaching components when the bicycle is to be temporarily stored, for example at a place of work or in an apartment. Additionally the bicycle embodiments may be configured to additionally reduce the collapsed extent by removing one or both of the wheels or other components such as the handlebars. In general, the embodiments described herein and variants of these embodiments would have a full size wheel that is typically associated with the frame configuration for each example of bicycle, which preserves the riding experience associated with the bicycle while providing the advantage of being collapsible.

While specific embodiments have been described and illustrated, such embodiments should be considered illustrative only and not as limiting the disclosed embodiments as construed in accordance with the accompanying claims.

What is claimed is:

1. A bicycle frame comprising:
   a rear frame structure including:
      a seat tube having a lower end and an upper end, the upper end being configured to receive a seat post for mounting a seat;
      a bottom bracket shell for receiving a bottom bracket configured to rotatably mount a crankset; and
      at least one chainstay extending rearwardly and terminating in a rear wheel mount for receiving a rear wheel, wherein a forward end of the chainstay, the lower end of the seat tube, and the bottom bracket shell are rigidly connected;
   a unitary front frame structure including:
      a down tube rigidly connected to a forwardly disposed head tube, the head tube configured to receive a steerable front wheel mount for receiving a front wheel, the down tube being connected to the rear frame structure at a pivot concentric with the bottom bracket shell, the pivot facilitating pivoting of the front frame structure with respect to the rear frame structure in a common vertical plane, about the pivot; and
      a crossbar having a forward end and a rearward end, the forward end being rigidly fixed to one of the down tube and the head tube, the crossbar spanning between the front frame structure and the rear frame structure;
   a frame lock disposed at the rearward end of the crossbar for locking the crossbar to the seat tube to substantially immobilize the pivot to place the frame in a riding condition, the frame lock, when disengaged, facilitating relative movement of the front frame structure and the rear frame structure towards each other about the pivot in the common vertical plane to place the frame in a collapsed condition wherein the down tube lies alongside the seat tube and the front frame structure and the rear frame structure are nested.

2. The bicycle frame of claim 1 wherein the rear frame structure further comprises at least one seat stay extending between the seat tube and the at least one chainstay.

3. The bicycle frame of claim 1 wherein the forward end of the crossbar is rigidly fixed to the head tube.

4. The bicycle frame of claim 3 wherein at least a portion of the rearward end of the crossbar comprises at least one arm laterally displaced with respect to the common vertical plane to provide clearance between the crossbar and the seat tube when the frame lock is disengaged, and wherein the front frame structure is pivoted toward the rear frame structure when placing the frame in the collapsed condition.

5. The bicycle frame of claim 4 wherein the at least one arm comprises a pair of arms laterally displaced toward either side of the common vertical plane.

6. The bicycle frame of claim 4 wherein the at least one arm is configured to permit the rear wheel to remain mounted in the rear wheel mount when placing the frame in the collapsed condition.

7. The bicycle frame of claim 6 wherein the at least one arm is configured to provide clearance between the at least one arm and drivetrain components of the bicycle to permit the drivetrain to remain configured for the riding condition and to further facilitate rotation of the rear wheel when the frame is in the collapsed condition.

8. The bicycle frame of claim 4 wherein the at least one arm is configured to provide clearance between the crossbar and at least one of the upper end of the seat tube and the seat post when placing the frame in the collapsed condition.

9. The bicycle frame of claim 1 wherein the frame lock comprises a fastener for connecting corresponding features on the rearward end of the crossbar and the rear frame structure to lock the frame in the riding condition.

10. The bicycle frame of claim 1 wherein the rearward end of the crossbar terminates at a location partway between the bottom bracket shell and the upper end of the seat tube to provide a step through frame geometry.

11. The bicycle frame of claim 1 further comprising a frame retainer configured to releasably secure the front frame structure to the rear frame structure when the frame is in the collapsed condition.

12. The bicycle frame of claim 1 wherein the frame lock is disposed proximate the upper end of the seat tube.

13. The bicycle frame of claim 1 wherein the frame lock comprises a length of tube disposed at the rearward end of the crossbar and oriented to align with the upper end of the seat tube when the frame is in the riding condition, the length of tube acting as the frame lock by receiving a seat post inserted through the length of tube and secured within the upper end of the seat tube.

14. The bicycle frame of claim 1 wherein the pivot is sized and configured to prevent lateral flexing of the frame about the pivot.

15. The bicycle frame of claim 1 wherein the bottom bracket shell comprises:
   a pair of cylindrical bores that are laterally spaced apart;
   a central cylindrical bore disposed between and aligned with the pair of cylindrical bores, wherein either the pair of cylindrical bores or the central cylindrical bore is connected to the down tube; and
   a cylindrical sleeve having an outer surface sized to fit through the pair of cylindrical bores and the central cylindrical bore for forming the pivot, the sleeve having an inner bore sized to receive a bottom bracket for mounting the crankset.

16. The bicycle frame of claim 15 wherein the cylindrical sleeve is fixed to at least one of the pair of cylindrical bores or the central cylindrical bore.

17. The bicycle frame of claim 16 further comprising a fastener configured to cause the cylindrical sleeve to be fixed to the other of the pair of cylindrical bores or the central cylindrical bore to immobilize bearing surfaces within the pivot when the frame is in the riding condition.

18. The bicycle frame of claim 1 further comprising a wheel retainer disposed on the frame for at least one of:
   attaching the front wheel to the collapsed frame such that the front wheel lies alongside the collapsed frame; and
   attaching the rear wheel to the collapsed frame such that the rear wheel lies alongside the collapsed frame.

19. The bicycle frame of claim 1 wherein the frame is configured to generally correspond to a frame geometry and a wheel size associated with one of:

a conventional bicycle;
an electric bicycle having an integrated electric motor for propulsion;
a road bicycle;
an urban commuter bicycle;
a touring bicycle;
a hybrid bicycle;
a cyclocross bicycle;
a single speed cross country mountain bicycle with rear suspension;
an internally geared rear hub cross country mountain bicycle with rear suspension; and
a fat bicycle.

20. A bicycle comprising:
the bicycle frame in accordance with claim 1;
a rear wheel mounted in the rear wheel mount;
a steerable front wheel mount mounted in the head tube;
a front wheel mounted in the front wheel mount; and
a saddle mounted via a seat post in the upper end of the seat tube.

21. The bicycle frame of claim 1 wherein the forward end of the at least one chainstay is rigidly connected to the lower end of the seat tube and wherein the bottom bracket shell is rigidly connected to the forward end of the at least one chainstay.

* * * * *